US012583551B2

(12) United States Patent
Taylor

(10) Patent No.: US 12,583,551 B2
(45) Date of Patent: *Mar. 24, 2026

(54) CARGO BICYCLE CONVERSION SYSTEM

(71) Applicant: Scott Taylor, Denver, CO (US)

(72) Inventor: Scott Taylor, Denver, CO (US)

( * ) Notice: Subject to any disclaimer, the term of this patent is extended or adjusted under 35 U.S.C. 154(b) by 807 days.

This patent is subject to a terminal disclaimer.

(21) Appl. No.: 17/579,248

(22) Filed: Jan. 19, 2022

(65) Prior Publication Data

US 2022/0135171 A1 May 5, 2022

Related U.S. Application Data

(63) Continuation of application No. 16/070,227, filed as application No. PCT/US2017/013830 on Jan. 17, 2017, now Pat. No. 11,260,928.

(51) Int. Cl.
| | |
|---|---|
| *B62K 7/04* | (2006.01) |
| *B62K 13/00* | (2006.01) |
| *B62K 21/18* | (2006.01) |
| *B62K 27/12* | (2006.01) |

(52) U.S. Cl.
CPC ................ *B62K 7/04* (2013.01); *B62K 13/00* (2013.01); *B62K 21/18* (2013.01); *B62K 27/12* (2013.01)

(58) Field of Classification Search
CPC .......... B62K 13/00; B62K 13/08; B62K 7/00; B62K 7/02; B62K 7/04; B62K 27/12; B62K 27/18
See application file for complete search history.

(56) References Cited

U.S. PATENT DOCUMENTS

| | | | | | |
|---|---|---|---|---|---|
| 4,469,344 | A | * | 9/1984 | Coil | B62K 5/08 |
| | | | | | 280/282 |
| 4,770,431 | A | * | 9/1988 | Kulik | A61G 5/1054 |
| | | | | | 280/202 |
| 6,092,820 | A | * | 7/2000 | Evans | B62J 7/04 |
| | | | | | 224/430 |
| 8,684,387 | B1 | | 4/2014 | Saiki | |
| 9,114,844 | B2 | | 8/2015 | Walter | |
| 10,577,045 | B2 | | 3/2020 | Walter | |
| 2004/0145147 | A1 | | 7/2004 | Asbury et al. | |

(Continued)

FOREIGN PATENT DOCUMENTS

| | | | |
|---|---|---|---|
| BR | 102013012530 A2 | 7/2016 |
| CA | 2657836 A1 | 9/2010 |

(Continued)

OTHER PUBLICATIONS

DE_4323120_A1 translation (Year: 1995).*

(Continued)

*Primary Examiner* — Christopher B Wehrly
(74) *Attorney, Agent, or Firm* — Benard IP Law, LLC

(57) ABSTRACT

The present disclosure relates generally to bicycles. In particular, the present disclosure provides systems and devices for converting a standard bicycle into a cargo bicycle using various detachable components. The ability to convert a standard bicycle into a cargo bicycle and back again confers many advantages, including eliminating the need for a separate bicycle for transporting cargo and encouraging the use of bicycles as a mode of transportation.

15 Claims, 12 Drawing Sheets

(56) References Cited

U.S. PATENT DOCUMENTS

| | | | | |
|---|---|---|---|---|
| 2009/0072520 A1* | 3/2009 | Ehrenreich | .............. | B62K 5/05 |
| | | | | 280/642 |
| 2013/0032425 A1* | 2/2013 | Lee | ........................ | B62K 19/34 |
| | | | | 180/220 |
| 2014/0091551 A1* | 4/2014 | Walter | ..................... | B62K 5/08 |
| | | | | 29/401.1 |
| 2015/0048584 A1 | 2/2015 | Lin | | |

FOREIGN PATENT DOCUMENTS

| | | | | | |
|---|---|---|---|---|---|
| DE | 4323120 A1 | * | 1/1995 | .............. | B62K 5/05 |
| DE | 102014110261 A1 | | 1/2016 | | |
| EP | 1690782 A1 | | 8/2006 | | |
| EP | 3015352 A1 | | 5/2016 | | |
| FR | 3018765 A1 | | 9/2015 | | |
| JP | S5163353 U | | 5/1976 | | |

OTHER PUBLICATIONS

Build a 2-wheel Cargo Bike: by "carkat" on insturctable.com; Sep. 20, 2011 [retrieved on Dec. 13, 2019]. Retrieved from: http://www.intrustble.com/id/build-a-2-wheel-cargo-bike/.

"Turn Your Bike into Cargo Bike"; Jul. 15, 2016 [retrieved on Feb. 12, 2021]. Retrieved from: https://www.youtube.com/watch?v=IncGTd7DLjl&ab_channel=NancyMelear.

Coxworth, Ben. "Bike kit lets you go Dutch in 60 seconds"; Jul. 11, 2016 [retrieved on Feb. 12, 2021]. Retrieved from : https://newatlas.com/the-lift-cargo-bike-kit/44284.

"The Lift Cargo Bike"; Oct. 17, 2016 [retrieved on Feb. 12, 2021]. Retrieved from: https://www.kickstarter.com/projects/1616617044/the-lift-cargo-bike.

* cited by examiner

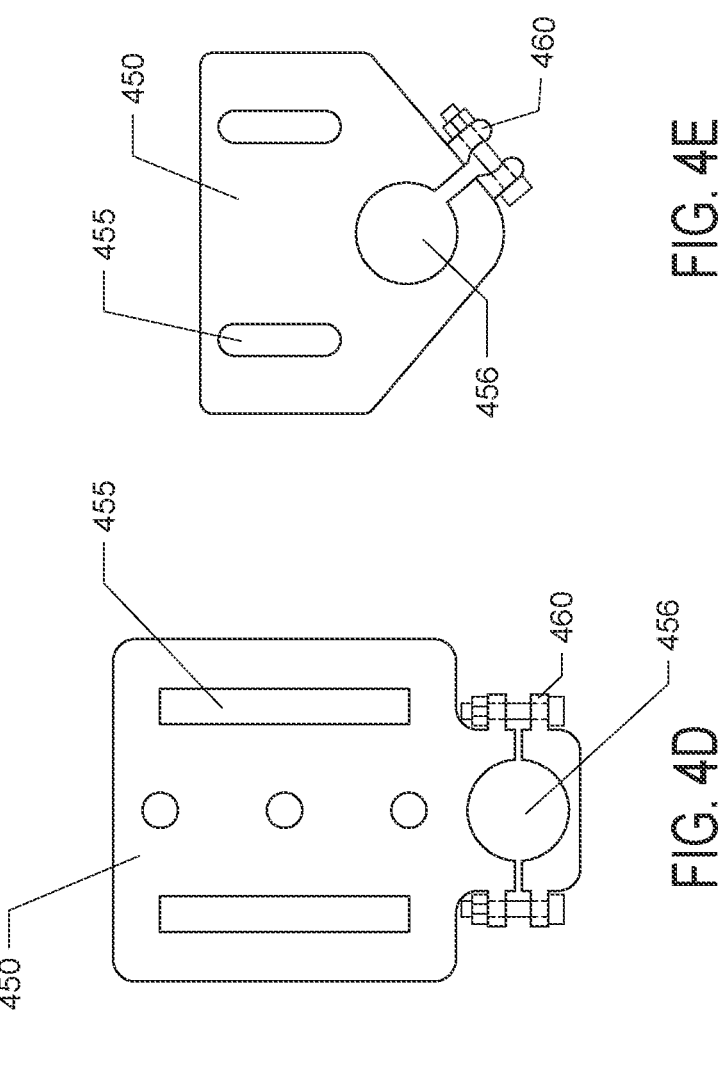
FIG. 4E
FIG. 4D
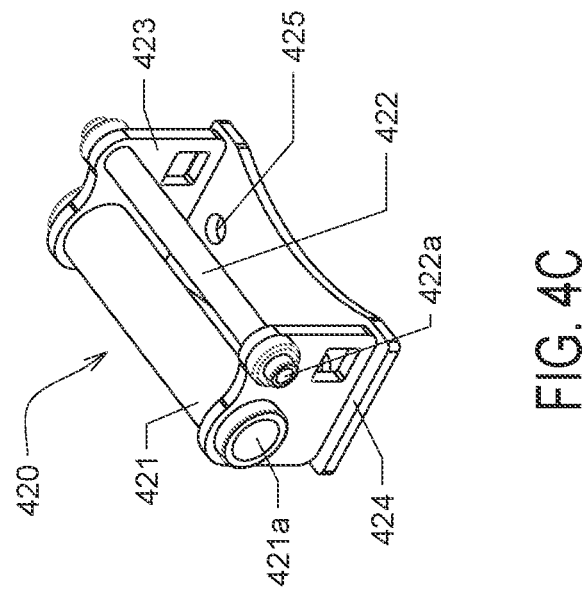
FIG. 4C

CARGO BICYCLE CONVERSION SYSTEM

RELATED APPLICATIONS

This application is a continuation of U.S. application Ser. No. 16/070,227 filed on 13 Jul. 2018, now U.S. Pat. No. 11,260,928, which was a national stage filing under 35 U.S.C. 371 of International Patent Application No. PCT/US2017/013830, filed 17 Jan. 2017, which claimed the benefit of priority from U.S. Provisional Patent Application No. 62/278,737, filed 14 Jan. 2016, the contents of all of which are hereby incorporated by reference in their entireties. Priority to these applications is hereby claimed.

FIELD OF THE INVENTION

The present disclosure relates generally to bicycles. In particular, the present disclosure provides systems and devices for converting a standard bicycle into a cargo bicycle using various detachable components.

BACKGROUND OF THE INVENTION

Although cargo bicycles are thought to have originated in Holland in the 19$^{th}$ century, cargo bicycles have proliferated around the world, including the United States, and are known by many names, such as, "box bicycle," "bakfiets," "delibicycles," "butcher's bicycles," "cycle trucks" and "long john bicycles." A cargo bicycle is generally considered any bicycle designed to carry a load that is not carried by the cyclist. Cargo bicycles can be designed with various features to facilitate the transportation of this cargo. In some cases, cargo bicycles include features designed to accommodate heavier-duty front or rear racks, features designed to accommodate smaller front wheels to reduce the center of gravity, and features designed to provide a larger range of low gears to reduce the effort required to transport the cargo. In other cases, cargo bicycles can include a frame with built-in accessories, such as an electric motor or an additional front or rear wheel, to address the specific commercial or personal needs of the cyclist.

As the population of urban centers increases and the effects of global climate change become more apparent, there has been an emphasis on cleaner forms of commercial and personal transportation. The cargo bicycle is uniquely positioned to address these concerns. However, many cyclists are often deterred from purchasing a separate bicycle designed only to transport cargo, especially a bicycle that is larger and perhaps more cumbersome than their standard bicycle. Additionally, to maximize their usefulness, cyclists are often forced to customize their cargo bicycles to address their individual cargo needs and/or to suit their individual physical profiles. This process and/or the purchase of additional bicycles can be complicated, time consuming, and expensive. Therefore, the ability to convert a standard bicycle into a cargo bicycle and back again confers many advantages, including, for example, eliminating the need for a separate bicycle for transporting cargo and encouraging the use of bicycles as a mode of transportation.

SUMMARY OF THE INVENTION

These and other needs are addressed by the various aspects, embodiments, and configurations of the present disclosure.

Embodiments of the cargo bicycle conversion system of the present disclosure are comprised of a cargo conversion frame detachably connected to a subject bicycle, at least one frame coupling component detachably connecting the cargo conversion frame to a portion of the frame of the subject bicycle, and a steering adapter system functionally coupling a portion of the subject bicycle (e.g., a fork, handlebar, and the like, attached to the subject bicycle) to a portion of the cargo conversion frame (e.g., a fork attached to the cargo conversion frame), and a brake coupling component detachably connecting the cargo conversion brake caliper cable to the subject bicycle (e.g., a cable splitter). The cargo bicycle conversion system of the present disclosure facilitates the reversible conversion of the subject bicycle into a cargo bicycle.

In some embodiments, the at least one frame coupling component of a cargo bicycle conversion system comprises a bottom bracket adapter configured to couple the cargo conversion frame to the subject bicycle frame at the bottom bracket shell.

In some embodiments, the bottom bracket adapter of a cargo bicycle conversion system is adjustably coupled to the cargo conversion frame to accommodate the subject bicycle, and the bottom bracket adapter is secured in position after being adjustable coupled to the cargo conversion frame.

In some embodiments, the at least one frame coupling component of a cargo bicycle conversion system comprises a fabricated component configured to couple the cargo conversion frame to a fabricated component on the subject bicycle, wherein fabrication comprises casted, machined, welded, forged or other methods of fabricating components.

In some embodiments, the steering adapter system of a cargo bicycle conversion system comprises a steering converter and a steering linkage, wherein the steering converter and the steering linkage are functionally coupled.

In some embodiments, the cargo bicycle conversion system further comprises a fork coupling component for detachably connecting the fork attached to the subject bicycle to the steering converter.

In some embodiments the fork coupling component of a cargo bicycle conversion system comprises at least one of the following connecting mechanisms for detachably connecting the fork attached to the subject bicycle to the steering converter: quick release skewers, thru axle skewers, straps, a solid axle with nuts, fork inching mechanisms, and combination and variations thereof.

In some embodiments the steering converter connection comprises an attachment point for the subject bicycles fork. This attachment is mechanically fastened to a tube that pierces the frame vertically through an aperture. The opposite end of the tube has one or more arms with connection point(s) to attach the steering linkage(s). The circular movement of the attachment point therefore matches the movement of the attached arm.

In some embodiments, the distal end of the steering linkage of the steering adapter system of a cargo bicycle conversion system is functionally coupled to the fork attached to the cargo conversion frame, wherein movement of the fork attached to the subject bicycle causes corresponding movement of the fork attached to the cargo conversion system through actuation of the steering converter and the steering linkage.

In some embodiments, the distal end of the steering linkage of the steering adapter system of a cargo bicycle conversion system is functionally coupled to the fork attached to the cargo conversion frame by at least one of the following mechanisms: nuts, bolts, screws, fasteners, clamps, straps, pins, cotter pins, couplers, plastic clips or joints, lock-and-key mechanisms, thru axles, quick release skewers, pivot joints, a ball-and-socket joints, rotational discs, pins, springs, welding and combinations and variations thereof.

In some embodiments, the steering linkage of the steering adapter system of the cargo bicycle conversion system is configured to extend from the steering converter to the fork of the cargo conversion frame along a path that is substantially adjacent to the cargo conversion frame.

In some embodiments, the steering linkage of the steering adapter system of the cargo bicycle conversion system is configured to have one or more steering linkages extending from the steering converter.

In some embodiments, the cargo bicycle conversion system further comprises at least one front wheel functionally coupled to the fork of the cargo conversion system.

In some embodiments, the cargo bicycle conversion system further comprises at least one cargo container, the at least one cargo container detachably coupled to the cargo conversion frame.

In some embodiments, the at least one cargo container is detachably coupled to the cargo conversion frame by at least one of the following mechanisms: nuts, bolts, screws, fasteners, clamps, straps, pins, cotter pins, couplers, plastic clips or joints, lock-and-key mechanisms, thru axles, quick release skewers, pivot joints, ball-and-socket joints, rotational discs, springs, hook-and-loop mechanisms, buckles, ties, ropes, welding and combinations and variations thereof.

In some embodiments, the at least one cargo container is comprised of grass (bamboo), wood, plastic, metal, metal alloys, polymeric material, carbon fiber, or combinations or variations thereof.

In some embodiments, the cargo conversion frame is comprised of grass (bamboo), wood, plastic, metal, metal alloys, polymeric material, carbon fiber or combinations or variations thereof.

In some embodiments, the at least one frame coupling component detachably connects the cargo conversion frame to a portion of the frame of the subject bicycle by mechanism comprising at least one securable thru bolt.

In some embodiments, the cargo conversion frame comprises a substantially linear portion configured to extend a certain distance from an area below the bottom bracket of the subject bicycle to the fork on the cargo conversion frame to accommodate the at least one cargo container.

In some embodiments, the distal end of the cargo conversion frame is angled upwards to accommodate the fork on the cargo conversion frame.

Embodiments of the present invention also include a cargo bicycle conversion kit that comprises: a cargo conversion frame detachably connectable to a subject bicycle, at least one frame coupling component detachably connecting the cargo conversion frame to a portion of the frame of the subject bicycle, at least one brake coupling component detachably connecting the cargo conversion brake caliper to the brake lever of the subject bicycle, and a steering adapter system functionally coupleable on the proximal end to a fork on the subject bicycle and on the distal end to a fork on the cargo conversion frame. The cargo bicycle conversion kit of the present disclosure facilitates the reversible conversion of the subject bicycle into a cargo bicycle.

Embodiments of the present disclosure also include a cargo bicycle conversion kit that comprises: a cargo conversion frame detachably connectable to a subject bicycle, at least one brake coupling component detachably connecting the cargo conversions brake caliper to the brake lever of the subject bicycle, at least one frame coupling component detachably connecting the cargo conversion frame to a portion of the frame of the subject bicycle, a steering adapter system functionally capable of extending the steering mechanism from the handlebar of the subject bicycle to the cargo conversion frame. The cargo bicycle conversion kit of the present disclosure facilitates the reversible conversion of the subject bicycle into a cargo bicycle.

These and other advantages will be apparent from the disclosure of the aspects, embodiments, and configurations contained herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Broadly, the present invention contemplates a system and components thereof for easily, quickly, and reversibly converting a standard bicycle into a cargo bicycle. When practiced as disclosed herein, the present invention provides a novel and effective system and kit, and is thus, useful as disclosed herein but is not intended to be limited to these uses.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 1A depicts a side view of the installed and engaged cargo bicycle conversion system; FIG. 1B is an exploded, non-limiting view of components comprising an embodiment of the present invention; and FIG. 1C depicts the cargo bicycle conversion system installed an unengaged with a subject bicycle.

FIG. 2A depicts a view of the steering mechanism adapted to a subject bicycle as part of the cargo bicycle conversion system of the present disclosure; FIG. 2B depicts a view of the proximal end of the steering linkage coupled to the steering converter that is actuated by the fork of the subject of the bicycle; and FIG. 2C depicts a view of distal end of the steering linkage that couples to and actuates the front fork of the cargo bicycle conversion system.

FIG. 3A depicts a isolated view of the non-drive side of an installed and unengaged cargo bicycle conversion system; FIG. 3B depicts a view from the non-drive side of the cargo conversion system attached to the subject bicycle with a thru bolt an isolated view of the non-drive side of an installed and engaged cargo bicycle conversion system; FIG. 3C depicts a nonlimiting, exploded perspective view of components comprising an embodiment of the frame coupling assembly; and FIG. 3D depicts an isolated view of the components comprising the coupling component assembly engaged with the frame of a subject bicycle.

FIGS. 4A-4F are representative images of a steering adapter system, according to one embodiment of the present disclosure. FIG. 4A depicts a view of the fork coupling component with the fork of a subject bicycle attached to the steering adapter system coupled to a steering converter; FIG. 4B depicts an exploded, nonlimiting view of components comprising an embodiment of the steering adapter system; FIG. 4C depicts an isolated view of an embodiment of a fork mount component of the steering adapter system according to an embodiment; FIG. 4D depicts an embodiment of a fork rake adjuster plate component of the steering adapter system according to an embodiment; FIG. 4E depicts an embodiment of a fork rake adjuster plate component of the steering adapter according to an embodiment; and FIG. 4F depicts a perspective view of the fork coupling component with a fork engaged via a quick release skewer.

FIG. 5A depicts a perspective view of an embodiment of a brake cable split housing base having a first and second housing stop, and a fastening means containment bridge; FIG. 5B depicts an isolated view of a cargo conversion frame brake caliper cable, a subject bicycle brake caliper cable, and a subject bicycle brake lever cable, each comprising a cable housing, housing end cap, and cable splitter; and FIG. 5C depicts an isolated view of a brake cable split housing system functionally engaged with a brake caliper and brake lever cable prior to final attachment prepared for functional engagement of a brake caliper cable and a subject bicycle brake lever cable.

DETAILED DESCRIPTION OF THE INVENTION

Figure 1A:
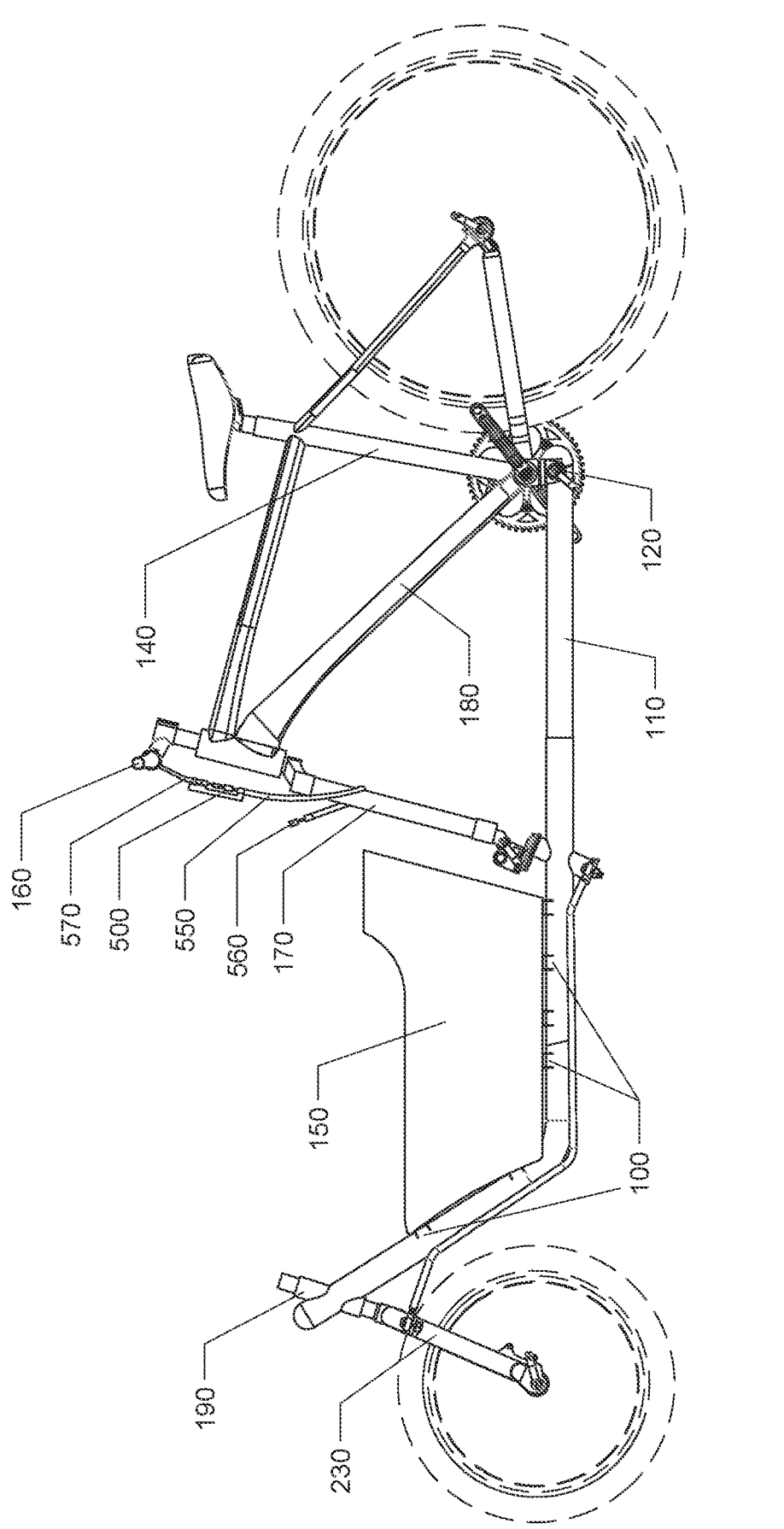
FIGS. 1A-C are representative isometric images of a subject bicycle equipped with a cargo conversion system, according to one embodiment of the present disclosure.

The embodiments of the present invention described herein provide exemplary embodiments only, and are not intended to be exhaustive, limit the scope, applicability or configuration of the disclosure. Rather, the description of the exemplary embodiments provides those skilled in the art with an enabling description for implementing one or more of exemplary embodiments. It is understood by those skilled in the art that various changes may be made in the function and arrangement of elements without departing from the spirit and scope of the invention as set forth in the appended claims.

Unless specifically noted, it is intended that the words and phrases in the specification and the claims be given their plain ordinary and accustomed meaning to those of ordinary skill in the applicable arts. Accordingly, various implementations may be very broadly adopted and applicable.

The present disclosure relates generally to bicycles. Described herein, in particular, the present disclosure provides systems and devices for converting a subject bicycle into a cargo bicycle using various detachable components. The cargo bicycle conversion system of the present disclosure provides systems and methods for simply and conveniently coupling and uncoupling a cargo container and front fork and wheel of a cargo conversion system to a standard bicycle such that the operational integrity of the subject bicycle is maintained. In certain ways, the cargo bicycle conversion systems of the present disclosure obviate the need for a separate bicycle for transporting cargo.

Each of the components comprising the presently disclosed invention may be constructed, e.g., via welding, machining, casting, forging, 3D printing, or other fabrication methods now known or known in the future that would produce components with appropriate attributes, e.g., size, shape, strength, weight.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A. B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (for example, $X_1$ and $X_2$) as well as a combination of elements selected from two or more classes (for example, $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

It should be understood that every maximum numerical limitation given throughout the present disclosure is deemed to include each and every lower numerical limitation as an alternative, as if such lower numerical limitations were expressly written herein. Every minimum numerical limitation given throughout the present disclosure is deemed to include each and every higher numerical limitation as an alternative, as if such higher numerical limitations were expressly written herein. Every numerical range given throughout the present disclosure is deemed to include each and every narrower numerical range that falls within such broader numerical range, as if such narrower numerical ranges were all expressly written herein, Conversion System Broadly, the cargo bicycle conversion system of the present invention is comprised of a cargo conversion frame, at least one frame coupling component, a steering adapter system, and an optional brake split housing adapter. The system may be installed on and used with standard bicycles having a non-suspended frame, or lockable suspension frame, and/or a non-suspended fork or lockable suspension fork, and facilitates the easy attachment of the bicycle to at least one standard or custom cargo container. As used herein, the term "cargo container" means container, box, seat, chair, rack, rickshaw, platform, basket, and the like, or any type of container designed to carry a load, including analogous and partially analogous terminology that the skilled artisan would understand as such. The cargo bicycle conversion system may accommodate a broad range of bicycle heights and frames styles, and may support a substantial amount of weight. The cargo bicycle conversion system is attached to the subject bicycle at, for example, two or more points, for example: 1) the subject bicycle frame; 2) the subject bicycle fork; and optionally, 3) the subject bicycle brake system.

Cargo Conversion Frame

The cargo conversion frame of the present invention may be comprised of a solid or tubular component, e.g., chromoly tubing, each of which may be configured in any shape, such as, square, circular, triangular, and may be constructed of any material appropriate in size, weight, and strength for its intended use. The cargo conversion frame may be constructed of a single unitary piece, multiple sections detachably or permanently coupled together, or telescoping sections. The latter two constructions, facilitating the adjustability of the cargo conversion frame to fit with multiple sizes and styles of bicycle frames. For example, the cargo conversion frame of the present invention may comprise a front-, a middle-, and a rear-frame, detachably coupled in sequential order.

Frame Coupling Component

The frame coupling component for attaching the cargo conversion frame of the present invention to, for example, the bottom bracket area of the frame of a subject bicycle may comprise: at least one plate, at least one threaded thru axle, and at least one adjustable tube, the frame coupling component configured to couple with the bottom bracket shell of a subject bicycle. The frame coupling component may further comprise one or more optional lock rings. Bottom Bracket frame coupling components may comprise: a bottom bracket link assembly comprising at least one bottom bracket plate, at least one bottom bracket tube, and at least one thru axle. The bottom bracket link assembly may further comprise one or more bottom bracket lock rings. The at least one plate, at least one thru axle, and at least one tube may couple via an attachment mechanism to the frame of the subject bicycle, and couple to the rear cargo conversion frame via a corresponding attachment mechanism. The frame coupling components may be secured after coupling, i.e., engagement, via a fastening means, such as a bolt, skewer, thru axle, thru bolt pin, spring, or the like. In some embodiments, the at least one frame coupling component of a cargo bicycle conversion system may comprise a fabricated component configured to couple the cargo conversion frame to a fabricated component on the subject bicycle.

Steering Adapter System

A steering adapter system comprising: a steering converter and adapter components, which may comprise standard equipment and/or concepts known in the art, or alternatively embody novel components, is rotatably mounted to the cargo conversion frame and functionally coupled to the fork of the subject bicycle on the proximal end of the steering adapter system, and rotatably and functionally coupled to the fork of the cargo conversion frame on the distal end of the steering adapter system. The steering adapter system is employed to maintain a 1:1 steering ratio when the cargo bicycle conversion system of the present invention is engaged, because cargo areas positioned between a rider and the front wheel of a bicycle distribute weight effectively but limit maneuverability of the bicycle. Additionally, long wheel bases may be slow to react to steering input, require exaggerated turning of handlebars, and reduce the turning radius of the bicycle. Therefore, maintaining a 1:1 steering ratio allows the rotation of the handle bars to be equivalent to the rotation of the cargo conversion frame wheel such that the bicycle steers the same with or without the cargo bicycle conversion system.

In some embodiments, the steering adapter system may comprise: one or more fork mounts, one or more fork rake adjuster plates, one or more steering arms, steering linkage, and one or more steering converter flanges, wherein a fork mount is adjustably coupled to a fork rake adjuster plate that is rotatably coupled to a steering arm having a steering converter flange, wherein the steering arm is functionally integrated with a head tube mounted through the cargo conversion frame, e.g., middle frame, using a non-threaded headset as bearings, wherein the steering converter flange rotatably couples to the proximal end of the steering linkage, and wherein the distal end of the steering linkage is rotatably mounted to the cargo conversion fork, via e.g., a heir joint functionally coupled to a fork tab. In use, moving the subject bicycle handlebar will change the position of the fork mount coupled to the fork rake adjuster plate, which in turn is coupled to the steering arm. When the steering arm is rotated, the steering converter flange then pulls or pushes the proximal end of the steering linkage coupled to the conversion frame fork on its distal end producing a 1:1 steering ratio, provided that the distance from the center diameter point of the steering arm to the proximal steering linkage pivot point on the steering converter flange is equivalent to the distance from the center diameter of the conversion fork steer tube to the pivot point of the distal end of the steering linkage.

Fork mounts known in the art and available commercially may be utilized in combination with the present invention. In a preferred embodiment, a non-standard, uniquely adapted fork mount comprising one or more differently sized fork mounts in a single component is adjustably and slidably coupled to a fork rake adjuster plate, in combination comprising a fork mount assembly. Alternative steering adapter systems and/or alternative steering systems may be utilized in the present Cargo Bicycle Conversion System. Alternative steering systems may include, e.g., direct steering, power steering, steering by leaning, or an independent turning cargo container wheel or wheels. In all or any of the steering adapter systems, steering linkage may comprise, for example, a rod, chain, belt, cable, or the like.

Brake Split Housing Adapter

Brake split adapters are know in the art. A brake splitter adapter comprising of, for example, two threaded tubes, male and female, a brake cable running from the subject bicycle brake lever runs inside of the brake housing. At a brake housing stop, the cable continues beyond the stop and is fastened to one part of the brake split adapter. The second part of the brake split adapter is threaded onto the first part. The second brake split adapter has a cable that extends beyond to insert into brake cable housing that is held in place by a brake cable housing stop.

The present brake split housing adapter disclosed herein is able to couple to the end of both the cargo conversion brake cable and/or the subject bicycle brake cable, such that the subject bicycle brake lever actuate whichever brake caliper, cargo conversion or subject bicycle, is connected to the brake split housing adapter. The brake split housing adapter may be employed to allow the brake cable from the brake lever of the subject bicycle to be connected to either the cargo conversion brake or to the installed brake on the subject bicycle. In an example of an embodiment of a brake split housing adapter that may be used in the present invention, the brake cable housing of the subject bicycle runs from the subject bicycle lever to a first housing stop of the brake split adapter. The subject bicycle's brake cable may run from the brake caliper to the opposite side and second housing stop of the brake split housing adapter. A third cable, i.e., cargo conversion brake cable, may run from the cargo conversion brake caliper to the second housing stop of the brake split housing. Either of the brake cables, i.e., cargo conversion or subject bicycle, may interchangeably be functionally coupled to the brake split adapter housing, and thus, the brake split adapter housing acts as a cable housing stop on both ends of the cable adapter housing. Additionally and/or optionally, an independent parking brake may be installed, or be part of the subject bicycle, to secure the resting bicycle, for example, when in use as a cargo bicycle.

Cargo Container

A cargo container may be removably, permanently, or semi-permanently attached to the cargo conversion frame prior to, concurrently with, or subsequent to engagement of the Cargo Bicycle Conversion System with the subject bicycle.

A cargo container may be fastened to the frame as a wholly constructed component at multiple attachment points on the front, middle, and/or rear frame of the conversion frame. Alternatively, a container base, or platform, may be mounted on the conversion frame and alternative container component embodiments may be attached thereto. Platform embodiments may be used in combination or as standalone components of the cargo container aspect of the invention. Cargo containers and/or container components may be constructed of, e.g., plastic, wood, metal, metal alloy, grass, carbon fiber, or any other suitable construction material. Cargo container components of the conversion frame system may further comprise, e.g., seating, strapping, handles, etc. A plethora of alternative construction embodiments and configurations of cargo containers is possible by the skilled artisan, some of which may be prefabricated and/or customized. Generally, a cargo container may be secured to the cargo bicycle conversion system via fastening means known in the art, e.g., alignment of apertures in the container base with correspondingly placed apertures or plates mounted on the cargo bicycle conversion frame, through which fastening means, e.g., carriage bolts and nuts, may be inserted and tightened.

In some embodiments, a front conversion frame may comprise a plurality of members configured to receive a cargo container having a plurality of corresponding conversion frame forks and/or wheels, to which a plurality of steering adapters may be functionally coupled.

All linkages and or connections described herein are intended to be easily implemented, i.e., easily connected and disconnected in a manner so that the subject bicycle rider may easily transition between bicycle and cargo bicycle. Once installed on the subject bicycle, standard maintenance using standard tools is all that is required to maintain, or quickly attach/detach the cargo container section to the subject bicycle for conversion purposes.

Moving now to the figures, as illustrated in FIG. 1A, the cargo bicycle conversion system of the present disclosure includes a cargo conversion frame 110, at least one frame coupling component 120, and a steering adapter system 125. The cargo conversion frame 110 is connected to a subject bicycle 140 in a manner that facilitates the attachment, detachment, and reattachment to the subject bicycle 140 at various points and through various attachment mechanisms. For example, the subject bicycle 140 can be attached to the cargo conversion frame 110 at various points on the frame of the subject bicycle 140, including but not limited to, an installed, e.g., mechanically attached, piece of material or apparatus on the frame, a manufactured, e.g., fabricated as addition to standard frame, piece or apparatus of the subject bicycle frame and/or the bottom bracket, of the subject bicycle frame. Additionally, to preserve the functionality of the subject bicycle 140, the front wheel of the subject bicycle 140 can be removed and stored, and the front fork of the subject bicycle 140 can be attached to the steering adapter system 125 of the cargo bicycle conversion system. In another example, the front fork of the subject bicycle 140 can be transferred to, and used as, a fork on the cargo bicycle conversion system. In another example, the front fork of the subject bicycle 140, including the front wheel, can be removed and stored, and the head tube of the subject bicycle 140 can be attached to a fork already attached to the steering adapter system 125 of the cargo bicycle conversion system. In another example, the steering adapter system 125, can include the functional extension and attachment of the steering mechanism of the subject bicycle 140 (e.g., handlebars 160) to the fork or wheel attached of the cargo conversion frame.

Additionally illustrated in FIG. 1A is that the cargo bicycle conversion system of the present disclosure may also include at least one cargo container 150. The cargo container 150 generally occupies a position between the fork 170 of the subject bicycle 140 and the fork 230 and wheel of the cargo bicycle conversion system (i.e., "front loaded" cargo bicycle). In this manner of attachment, the cargo conversion frame 110 of the cargo bicycle conversion system creates a triangle with the subject bicycle fork 170 and down tube 180 providing structural integrity and strength while expanding the area in which a cargo container 150 can be positioned. In some embodiments, the cargo conversion frame 110 comprises a substantially linear portion configured to extend a certain distance from an area below the bottom bracket of the subject bicycle to the fork 230 on the cargo conversion frame 110 or head tube 190 to accommodate the cargo container 150. In some embodiments, the distal end, or front, of the cargo conversion frame 110 is angled upwards at an acceptable angle in order to accommodate the fork 230 and/or head tube 190 on the cargo conversion frame 110. In some embodiments, the cargo conversion frame 110 is comprised of a plurality of sections (see, FIG. 1B), e.g., a rear frame section 113, a middle frame section 112, and a front frame section 111, that may be sequentially and/or adjustably coupled. In some embodiments, the cargo conversion frame 110 may have a front frame section configured to have a plurality of frame spines, e.g., split into 2 or more front frame sections originating from the front frame section coupling end, to accommodate a plurality of cargo conversion frame forks, head tubes, and/or wheels.

A cargo container 150 can be detachably coupled to the cargo conversion frame 110, such that a user can easily attach, detach, and reattach the cargo container 150 to the cargo conversion frame 110, with or without the presence of cargo within the cargo conversion container 150. In some embodiments, the cargo conversion container 150 can be attached, detached, and reattached from the cargo conversion frame 110 in segments or pieces, rather than attaching, detaching, and reattaching the entire cargo conversion container 150 as whole. In some embodiments, the cargo conversion container 150 can be attached to the cargo conversion frame 110 in a manner that is not easily detachable or reattachable, e.g., permanent, semi-permanent, depending on the individual needs or wants of the user. Mechanisms by which a cargo container(s) 150 can be attached to a cargo conversion frame 110 of the cargo bicycle conversion system can include, but are not limited to, nuts, bolts, screws, fasteners, clamps, straps, pins, cotter pins, couplers, plastic clips or joints, lock-and-key mechanisms, thru axles, quick release skewers, pivot joints, ball- and socket joints, rotational discs, springs, hook-and-loop mechanisms, buckles, ties, ropes, welding, and combinations and variations thereof, coupled directly to the cargo conversion frame or, e.g., one or more mount plates 100 mounted on the cargo conversion frame (see, FIG. 1B). One or more, preferably a plurality, of mount plates 100 may be permanently, semi-permanently, or detachably mounted to the surface of the cargo conversion frame 110 for securing a cargo container 150 thereto. Alternatively and/or additionally, one or more mount plates may be fabricated as part of the cargo conversion frame.

The cargo conversion frame 110 and the cargo container 150 can be comprised of various materials, and in some cases, they can be comprised of the same materials or different materials. For example, the cargo conversion frame 110 and/or the cargo container 150 of the cargo bicycle conversion system of the present disclosure can be made from materials that include, but are not limited to, grass (bamboo), wood, paper, plastic, metal, metal alloys, polymeric material, carbon fiber, and combinations and variations thereof. Additionally, both the cargo conversion frame 110 and the cargo container 150 can be comprised of various materials having various shapes and sizes, as would be readily recognized by one of ordinary skill in the art based on the present disclosure.

Additionally illustrated in FIG. 1A is that the cargo bicycle conversion system of the present disclosure may also include a brake split housing adapter 500 useful for employing the brake lever cable 570 of the subject bicycle for actuation of the cargo conversion brake caliper cable 550 and/or the actuation of the subject bicycle brake caliper cable 560.

Figure 1B:
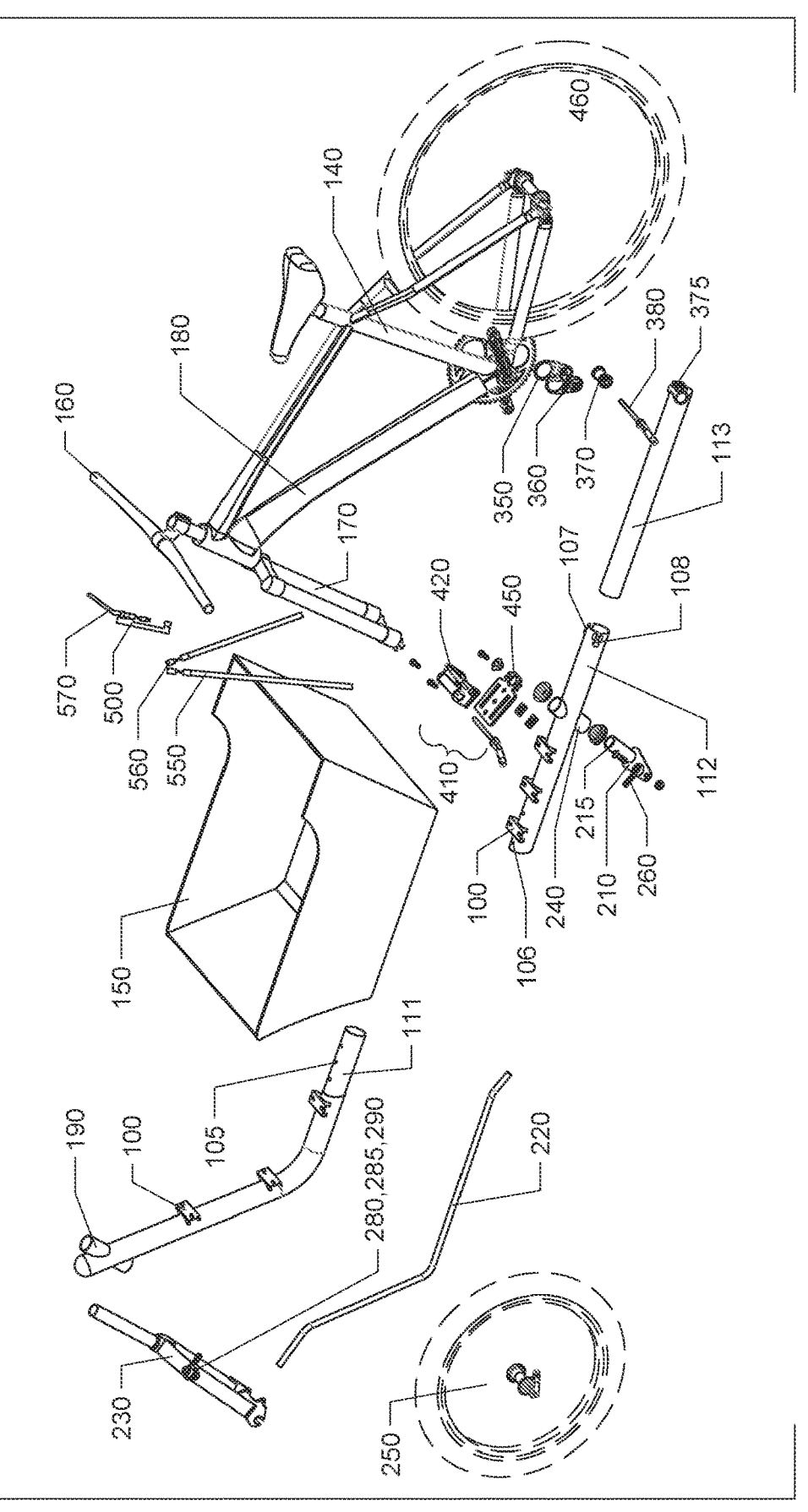

For illustrative purposes and clarity, FIG. 1B depicts an exploded view of individual components of an embodiment of the present invention and how they may relate to one another, but is not necessarily intended to be comprehensive or limiting. FIG. 1B is intended to be nonlimiting and exemplary for reference.

Figure 1C:
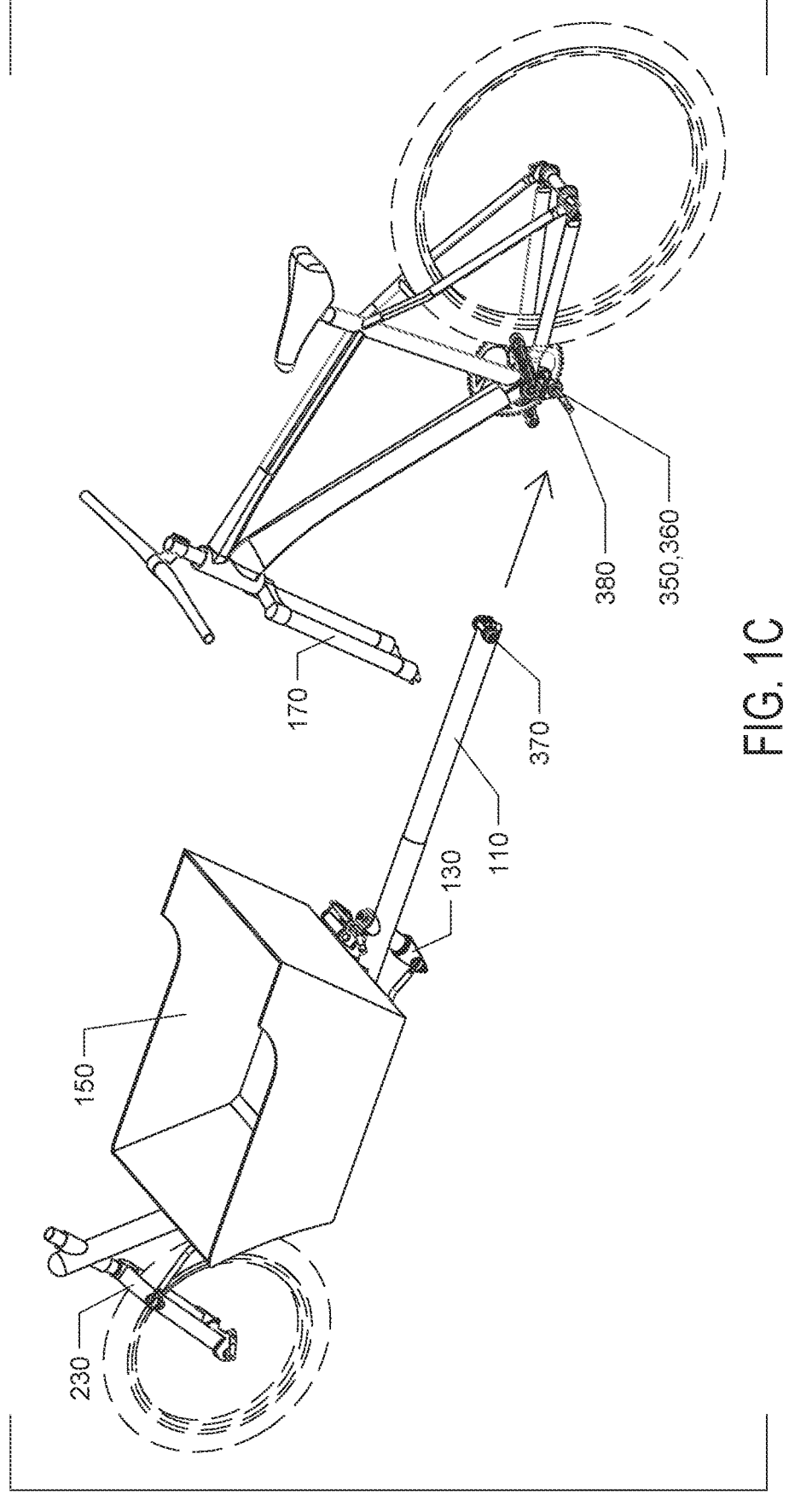

FIG. 1C depicts the assembled cargo conversion frame 110 and cargo container 150 portion of the cargo bicycle conversion system of the present invention disengaged from the subject bicycle 140 portion. The frame coupling component 120, i.e., bottom bracket adapter system, comprising a bottom bracket assembly comprised of at least one bottom bracket plate 350, 360, at least one bottom bracket tube 370, and at least one thru bolt 380, is installed on the subject bicycle, such that the assembled cargo conversion frame 110 and cargo container 150 portion of the conversion system with an installed bottom bracket tube 370 may be engaged with and detachably coupled to the subject bicycle 140 by engaging the bottom bracket plate or plates 350, 360 and inserting a thru bolt 380 there through.

Figure 2A:
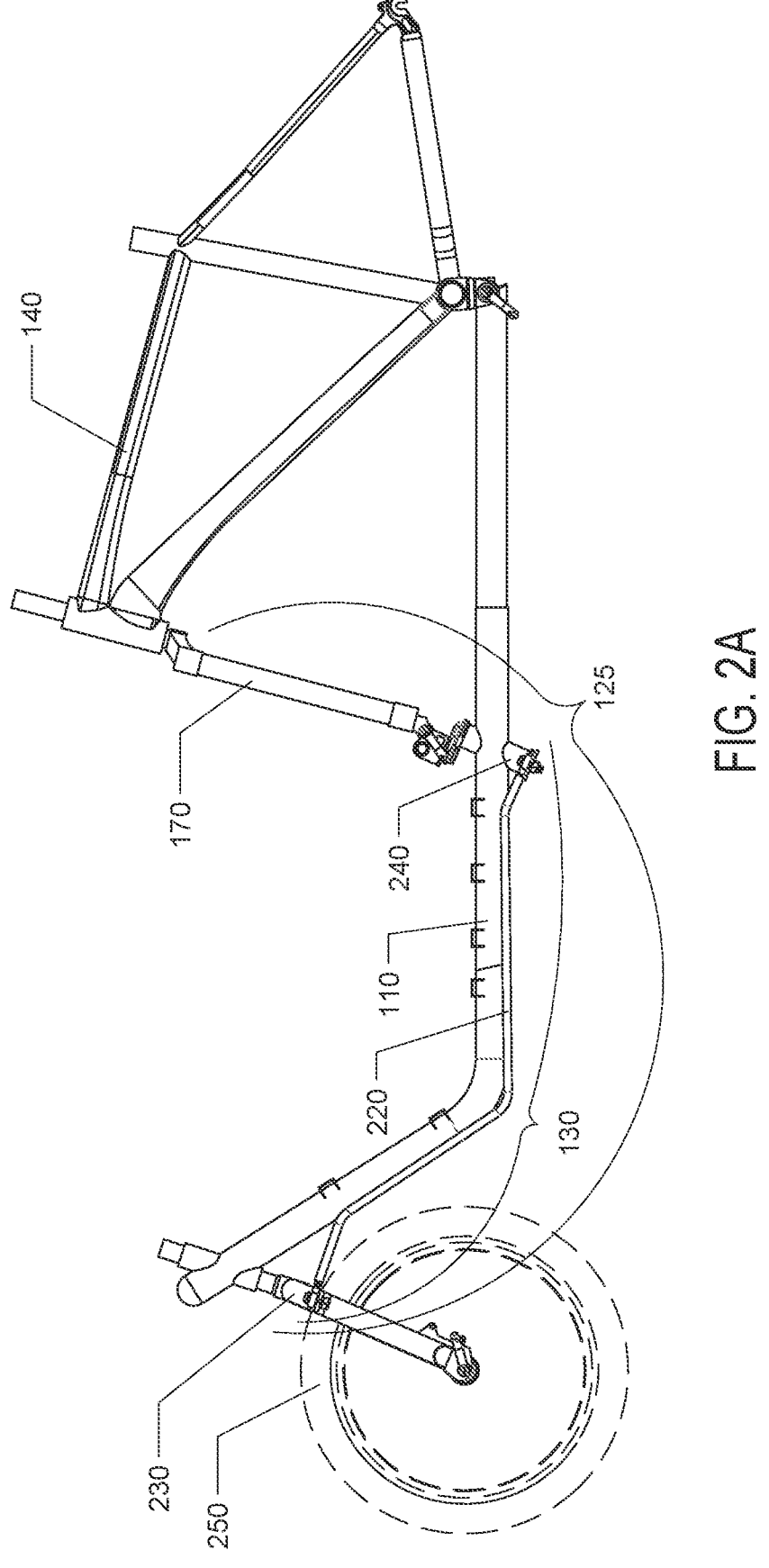
FIGS. 2A-2C are representative images of the frame of a cargo conversion system attached to a subject bicycle according to one embodiment of the present disclosure.
Figures 2B, 2C:
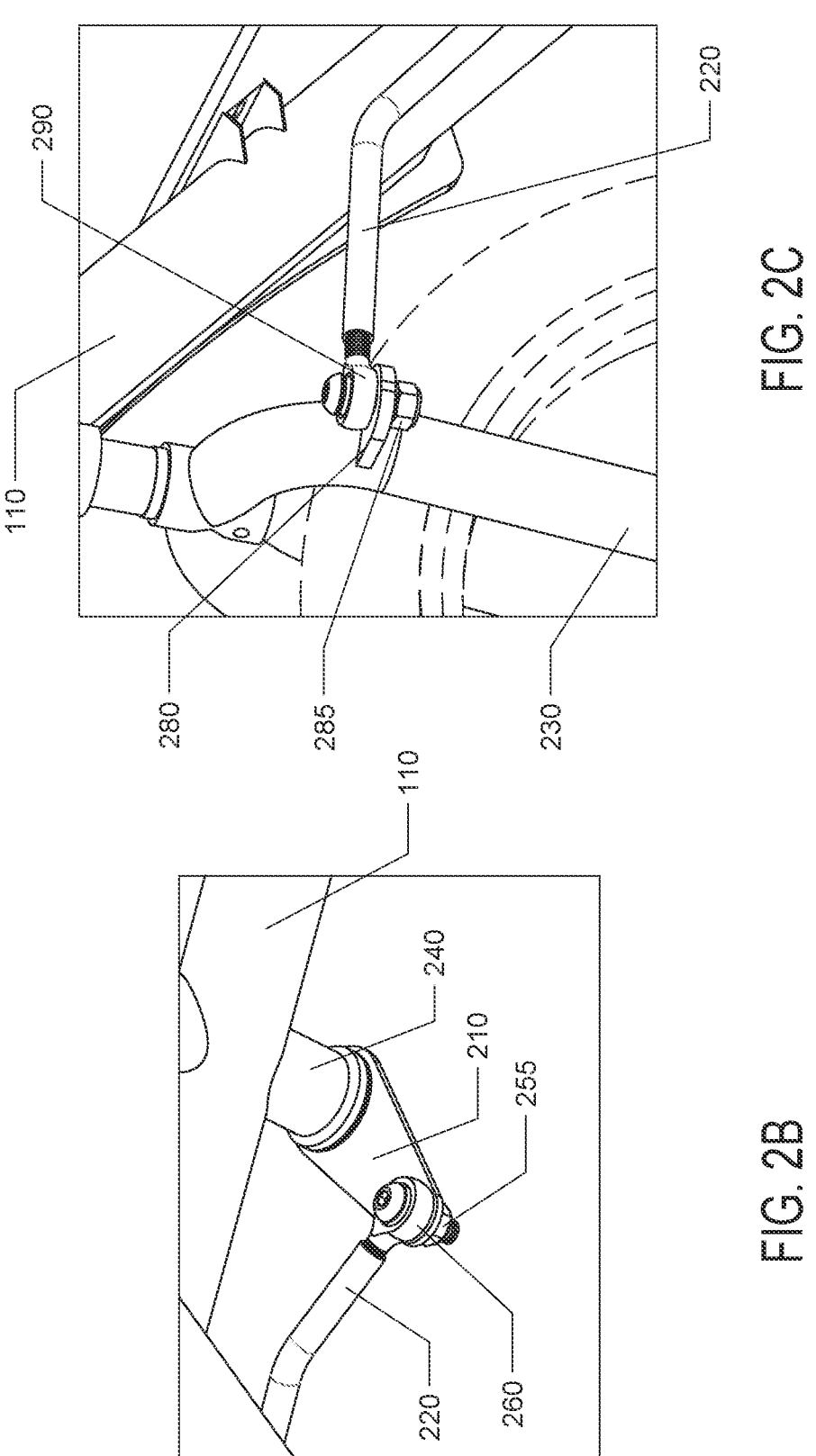
Figure 4A:
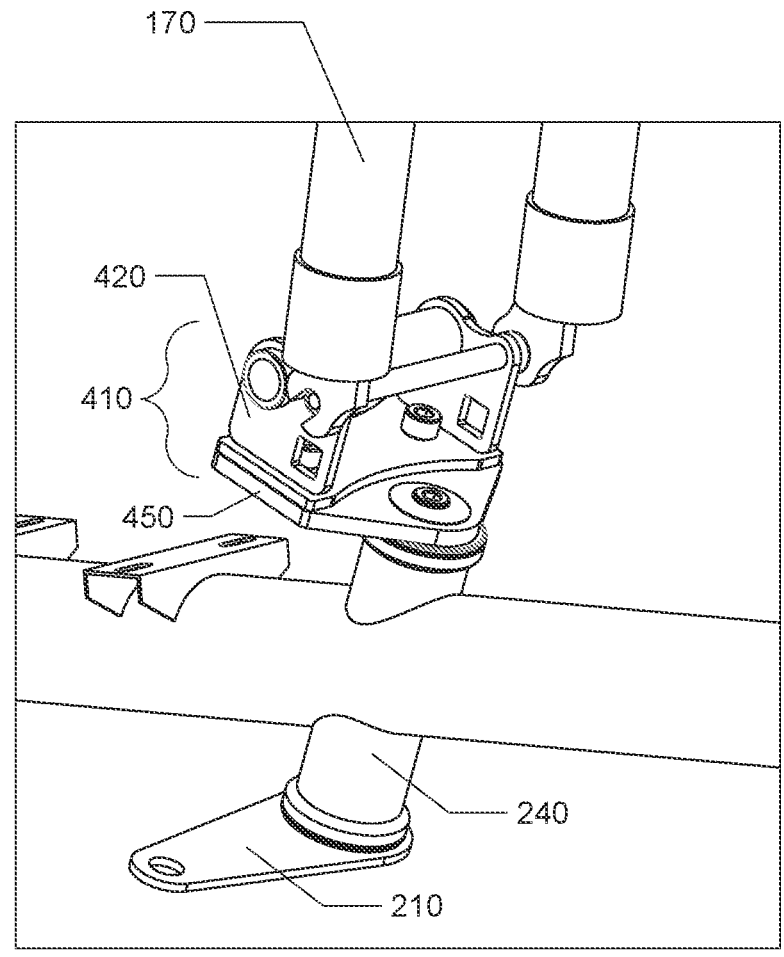

As further illustrated in FIGS. 2A-C, the cargo bicycle conversion system of the present disclosure further comprises a steering adapter system 125 comprising a steering assembly 130 and a fork coupling assembly 410 (see, FIG. 4A). As shown in FIG. 2A, the steering assembly 130 portion of the steering adapter system 125 of the present disclosure generally comprises a steering arm 215 with a distal end steering converter flange 210 extending there from, and steering linkage 220. The steering adapter system 125 is designed to functionally couple the fork 170 attached to the subject bicycle 140 (see, e.g., FIG. 1) to the fork 230 attached to the cargo conversion frame 110 so that the rider of the subject bicycle 140 can effectively steer the subject bicycle 140 when it is coupled to the cargo bicycle conversion system, i.e., the operational integrity of the subject bicycle is maintained. The steering linkage 220 can be configured to extend from the steering converter 210 (proximal end of linkage) to the fork 230 attached to the cargo conversion frame 110 (distal end of linkage) along a path that is substantially adjacent to the cargo conversion frame 110. This configuration can prevent the steering linkage 220 from interfering with the attachment and/or functionality of other components of the system, such as, the cargo container 150. The steering linkage 220 may be comprised of a single, unitary linkage component, or comprised of a plurality of coupled sections, e.g., a front or distal linkage section coupled to a rear or proximal linkage section.

FIG. 2B illustrates a steering arm 215 (not shown, see, FIG. 1B) inserted and rotatably mounted within a headtube 240 piercing the cargo conversion frame 110, the steering arm 215 having a steering converter flange 210 extending therefrom, the distal portion of the steering converter flange 210 adapted for coupling, i.e., having an aperture intended for coupling purpose, thus, may be functionally and rotatably coupled to both the fork 170 attached to the subject bicycle 140, e.g., through fork coupling component(s) (see, e.g., FIG. 4A-C), and the proximal end of the steering linkage 220. Because the steering converter flange 210 is functionally and rotatably coupled to the steering linkage 220 and the handlebars 160 of the subject bicycle (through the fork 170 of the subject bicycle), the steering converter flange 210 is able to convert a rider's actuation of the handlebars of the subject bicycle 140 into corresponding movement in the fork 230 attached to the cargo conversion frame 110, which in turn steers the cargo bicycle. The proximal end of the steering linkage 220 can be rotatably coupled to the steering converter flange 210 through various mechanisms, including but not limited to, nuts, bolts, couplers, screws, fasteners, quick release skewers, thru axles, thru bolts, clamps, rivet, plastic clips or joints, lock-and-key mechanisms, pivot joints, a ball-and-socket joints, universal joints, bushings, rotational discs, straps, cotter pins, pins, springs, welding and combinations and variations thereof. In some embodiments, a nut 255 can be mounted, e.g., welded or threaded onto a screw, to the coupling aperture of steering converter flange 210, an eye bolt 260, e.g., heim joint or fastener, can be coupled, e.g., threaded, to the proximal end of the steering linkage 220, and the two can be connected such that the steering adapter system 125 is adjustable, e.g., in length via threading or unthreading of the eye bolt 260.

Additionally, as illustrated in FIG. 2C, the distal end of the steering linkage 220 may couple to and actuate the fork 230 attached to the cargo conversion frame 110 when a rider moves the handlebars 160 of the subject bicycle 140. The distal end of the steering linkage 220 can be rotatably coupled to the fork 230 attached to the cargo conversion frame 110 through various mechanisms, including but not limited to, nuts, bolts, screws, couplers, fasteners, quick release skewers, thru axles, clamps, rivet, plastic clips or joints, lock-and-key mechanisms, pivot joints, a ball-and-socket joints, universal joints, bushings, rotational discs, pins, springs, and the like. In some embodiments, a tab 280 can be mounted, e.g., welded or fabricated thereon, to a portion of the fork 230, an eye bolt 290, e.g., heim joint, can be coupled, e.g., threaded, to the distal end of the steering linkage 220, and the tab 280 and steering linkage 220 can be connected, e.g., with a nut mechanism 285, welded or threaded, such that the steering adapter system 125 is adjustable, e.g., in length via threading or unthreading of the eye bolt 290.

Figure 3B:
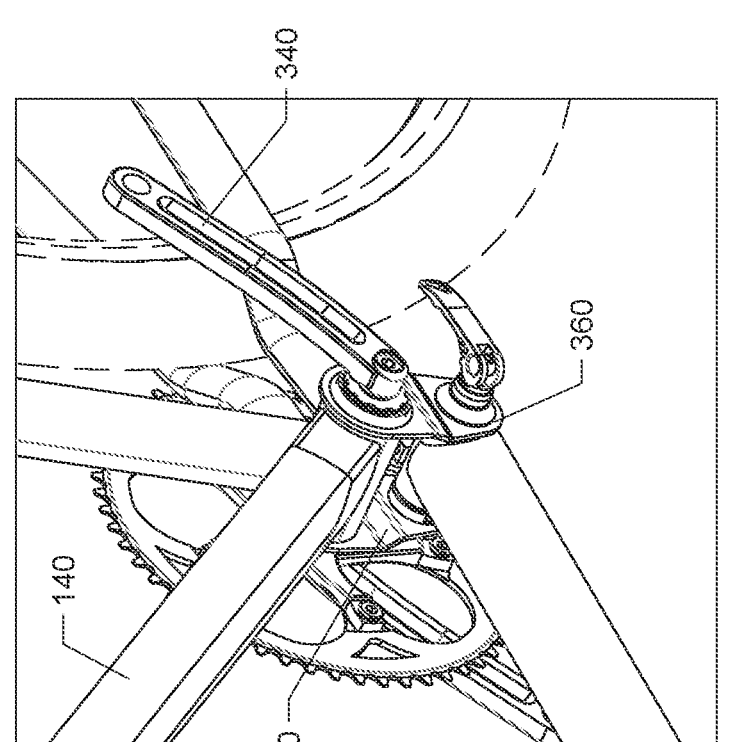
FIGS. 3A-3D are representative images of the frame coupling component and its attachment to the bottom bracket area of a subject bicycle, according to one embodiment of the present disclosure.
Figure 3A:
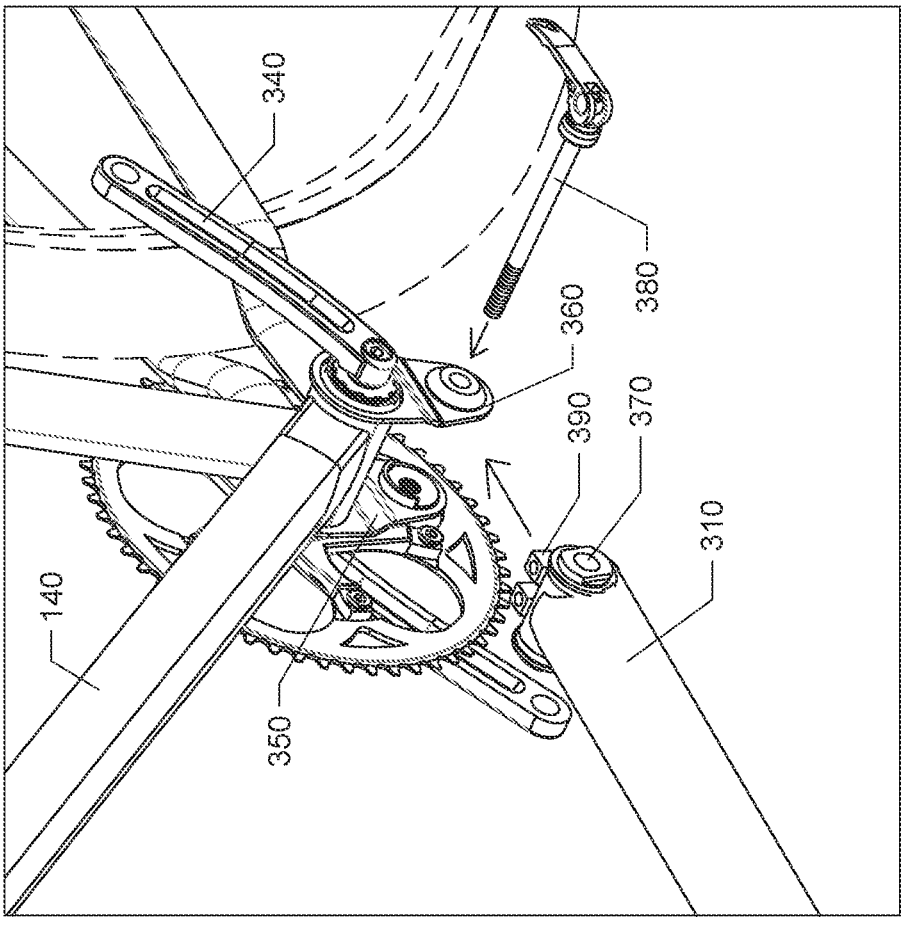

As illustrated in FIGS. 3A-3D, the cargo bicycle conversion system of the present disclosure includes various coupling components for attaching, detaching, and reattaching the cargo bicycle conversion system of the present disclosure to a subject bicycle. In some embodiments, one manner of attachment of the cargo bicycle conversion system of the present disclosure includes at least one frame coupling component (see, e.g., FIGS. 3A-3B), comprised of a bottom bracket adapter. The frame coupling component can be a bottom bracket adapter designed to couple to the cargo conversion frame 110 in the general area of the bottom bracket of the subject bicycle 140. In some embodiments, the bottom bracket adapter may be comprised of at least one bottom bracket plate at least one bottom bracket tube, and at least one thru bolt, e.g., quick release skewer. The adapter may optionally further comprise at least one lock ring. As shown in FIGS. 3A-3B, in some embodiments, the bottom bracket adapter comprises two bottom bracket plates 350, 360 that may be mounted to the bottom bracket shell of the subject bicycle 140, a bottom bracket tube 370 may be mounted to the distal end 310 of a rear frame 113 via, e.g., a pinch clamp 375 or other mechanism, and the bottom bracket adapter detachably engaged via a thru bolt 380. Optionally, one or more lock rings 352 (see, FIG. 3C) may be employed in the bottom bracket adapter, e.g., on the drive side if the bottom bracket has no flange. In some embodiments, the components of the bottom bracket adapter may be switched, i.e., the plates mounted to the frame and the bottom bracket tube mounted to the bottom bracket shell.

Figure 3D:
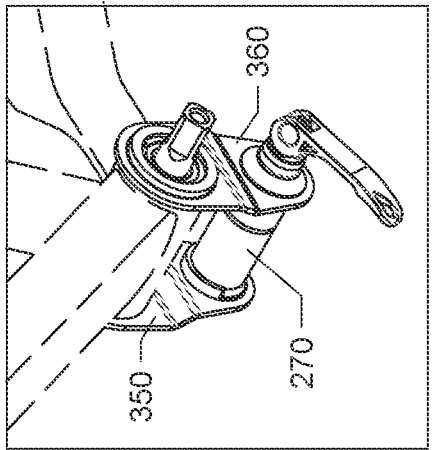
Figure 3C:
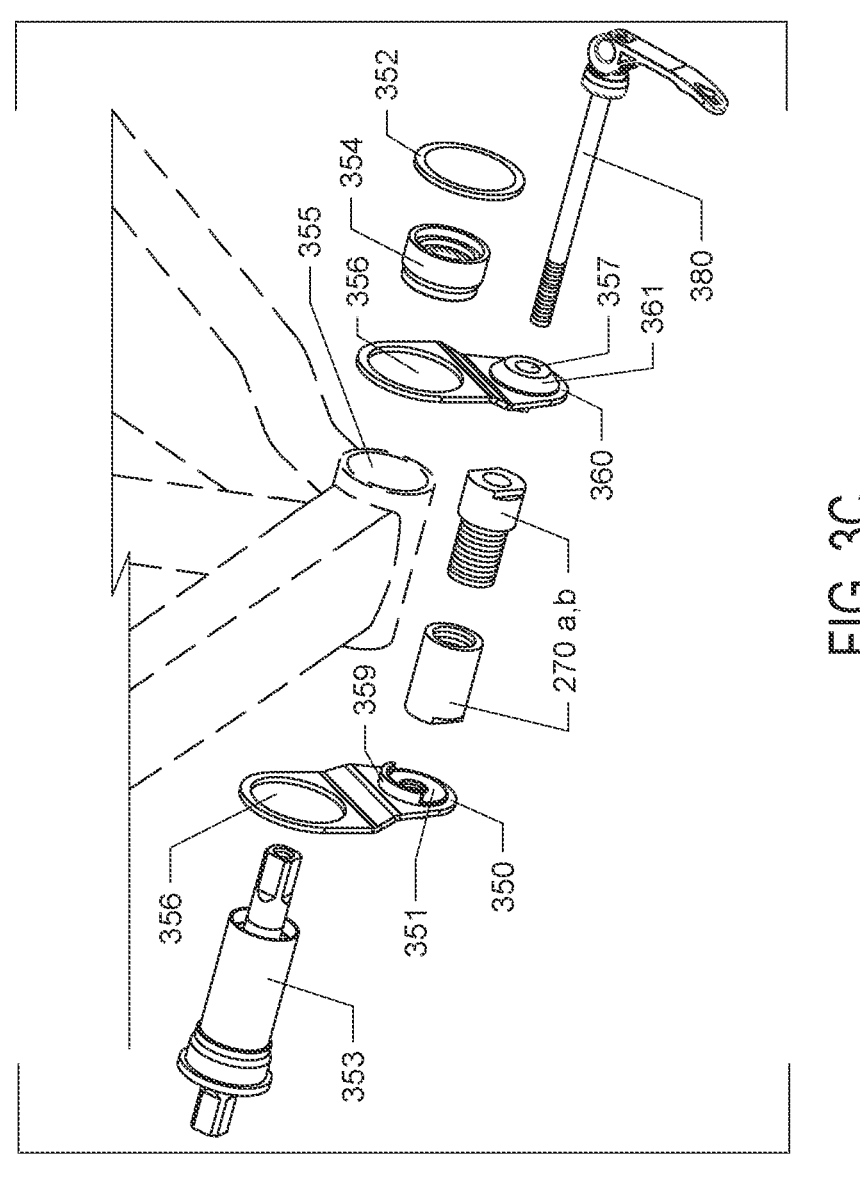

In some embodiments, two bottom bracket plates 350, 360 are coupled, one on each side, to the bottom bracket shell 355 of the subject bicycle 140 (see, FIG. 3C). A bottom bracket plate is generally comprised of a flat sheet or strip of material, e.g., metal or other material, having a general top, bottom, and sides. The bottom bracket plates disclosed herein are oval in overall shape with a mid-crosscrimp, e.g., s-bend, however, any overall plate shape not interfering with the functionality of the plate or other system or bicycle components may be employed. Each plate has an upper aperture 356, i.e., located in the upper half of the plate, e.g., above the s-bend, and a lower aperture 357, i.e. located in the lower half of the plate, e.g., below the s-bend. The lower aperture 357 is further comprised of an threaded thru bolt guide 351 on bottom bracket plate 350, and an unthreaded thru bolt guide 361 on bottom bracket plate 360 mounted, e.g., affixed or manufactured, on one surface of the bottom bracket plate 350, 360 and a bottom bracket tube stop 359 on the opposite surface of each plate at the about 12 o'clock position above each thru bolt guide 351, 361. For installation of the bottom bracket plates 350, 360, the thru bolt guides 351, 361 preferably face away, i.e., outward, from the bottom bracket shell 355 of the subject bicycle, and the bottom bracket tube stop 359 preferably faces the bottom bracket shell 355 of the subject bicycle. It should be noted that surface misorientation of either of the bottom bracket plates 350, 360 will not disturb or destroy the functionality thereof. The thru bolt guide 351 of the bottom bracket plate 350 intended for installation on the drive side of the subject bicycle 140 further comprises threads on the internal surface of the guide aperture 357. The thru bolt guide of the bottom bracket plate 360 intended for installation on the non-drive side of the subject bicycle 140 is unthreaded on the internal surface of the guide aperture 357. Each bottom bracket plate 350, 360 may be installed on either the drive side or non-drive side of the subject bicycle; access and installation are simplified by installing the bottom bracket plate 350 having the threaded thru bolt guide 351 on the drive side of the subject bicycle according to steps disclosed herein. Once coupled to the bottom bracket, the bottom bracket adapter can remain in place with or without the attachment of the remaining components of the cargo bicycle conversion system installed, i.e., the bottom bracket adapter can be installed on and attached to the subject bicycle 140 without interfering with its pedaling or other functions. In some configurations and embodiments, a bottom bracket adapter can be permanently coupled to the frame of the subject bicycle 140, and/or the subject bicycle can be manufactured to include a bottom bracket adapter as part of its structure. Generally, the bottom bracket adapter resides on the subject bicycle and the bottom bracket tube resides on the cargo conversion frame.

By way of example, bottom brackets 350, 360 may comprise an about 2.5 mm thick plate of steel having an about 30.9 mm upper aperture 356, and a lower about 12 mm, aperture 357 situated about 53.5 mm below (center to center) the upper aperture. The drive side bottom bracket plate 350 may have a threaded thru bolt guide insert 351, e.g., M12 threading, of about 10 mm thickness welded to the plate. In some embodiments, there is an s-bend so that the upper 356 and lower apertures 357 are offset, e.g., by about 3 mm while remaining parallel. The non-drive side bottom bracket plate 360 carries the same specifications as the drive side plate except the thru bolt guide 361 is a non-threaded about 5 mm insert mounted, e.g., welded to the plate.

Additionally illustrated in FIG. 3C is a bottom bracket tube 270 comprised of a threaded female component 270a and a corresponding threaded male component 270b. Engagement of the tube components 270a and 270b creates bottom bracket tube 270 adjustable through rotation, either clockwise or counter clockwise, of the tube components 270a, 270b. Subsequent to adjustment as disclosed herein, the bottom bracket tube 270 may be mounted to the distal end of rear frame 310 of the rear conversion frame 113 by, e.g., inserting it into a pinch clamp 375 (see, FIG. 1B) on the terminus of the distal end 310 of the rear frame of the conversion frame 113 (see, FIG. 3A).

By way of example, a bottom bracket tube may comprise, e.g. a steel shaft female component about 36 mm long×25 mm diameter, having 30 mm of M20×1.5 female threads from one direction and an about 12 mm aperture on the remainder of about 6 mm, and a 19 mm flats on the outside at the 12 mm aperture, and a steel shaft corresponding male component about 46 mm long×25 mm diameter, having 27 mm of M20×1.5 male threads from one direction, a threaded shaft about 18 mm long, a 12 mm internal diameter corresponding to the internal diameter of the female component and the outside diameter of the thru axle, and a 19 mm flats on the outside at the 12 mm opening.

As shown in FIGS. 3B and 3D, the coupling of the frame coupling component, i.e., bottom bracket adapter, to the cargo conversion frame 110 and to the frame of the subject bicycle 140 is secured by inserting a threaded thru bold 380 through the unthreaded thru bolt guide 361, e.g., on the non-drive side of the subject bicycle 140, through the center of the bottom bracket tube 270, and threaded into the opposite and threaded thru bolt guide 351 on, e.g., the drive side of the subject bicycle. Thus, the thru bolt 380 detachably engages conversion frame 110 to subject bicycle 140.

In some embodiments, a bottom bracket adapter may be constructed as a single piece (manufactured or constructed of multiple components), installed on the distal end 310 of the rear conversion frame 113, wherein a pair of flanges project upward from the bottom bracket adapter such that the flanges can be inserted between the crank arm 340 and bottom bracket of the subject bicycle 140 and each side of the bottom bracket shell of the subject bicycle 140 and be secured in place by the tension provided by, e.g., a crank bolt. The distance between the flanges can be pre-determined to fit standard bottom bracket widths, or the bottom bracket adapter can have flanges that are slidably configured to extend laterally outward, or compress laterally inward, to accommodate a range of bottom brackets.

In some embodiments, the bottom bracket adapter may be mounted to the distal end 310 of the rear conversion frame 113 in combination with the bottom bracket tube 270, and thereafter the conversion frame may be detachably engaged with the bottom bracket of subject bicycle, e.g., with a thru bolt.

Bicycles vary in three primary ways. They can have different length main tubes (e.g., top tube length of about 56 cm), different fork rakes (e.g., about 42 mm) and bottom bracket width (e.g., about 68 mm). Because bicycle frames range in size, the frame coupling components 120 of the present disclosure are generally adjustable such that they can facilitate the proper attachment of the cargo conversion frame 110 to the subject bicycle 140.

Additionally or alternatively, some embodiments of the cargo bicycle conversion system of the present disclosure, may include frame coupling components that detachably couple the cargo conversion frame 110 to various portions of the frame of a subject bicycle 140. For example, a frame coupling component can include a down tube adapter configured to couple the cargo conversion frame 110 to a portion of the down tube on the subject bicycle 140. In another example, a frame coupling component can include a seat tube adapter configured to couple the cargo conversion frame 110 to a portion of the seat tube on the subject bicycle 140. In another example, a frame coupling component can include a top tube adapter configured to couple the cargo conversion frame 110 to a portion of the top tube on the subject bicycle 140. In another example, a frame coupling component can include a mid-electric motor mount adapter configured to couple the cargo conversion frame 110 to the motor mount of the subject bicycle 140. As one of ordinary skill in the art would readily recognize based on the present disclosure, more than one frame coupling component can be used to detachably couple the cargo conversion frame 110 to a subject bicycle 140 at more than one position on the frame of the subject bicycle 140. In some embodiments, one or more additional components can be attached to a portion of the frame of a subject bicycle, and these additional components can facilitate the connection of the cargo conversion frame 110 to the subject bicycle 140.

Figure 4B:
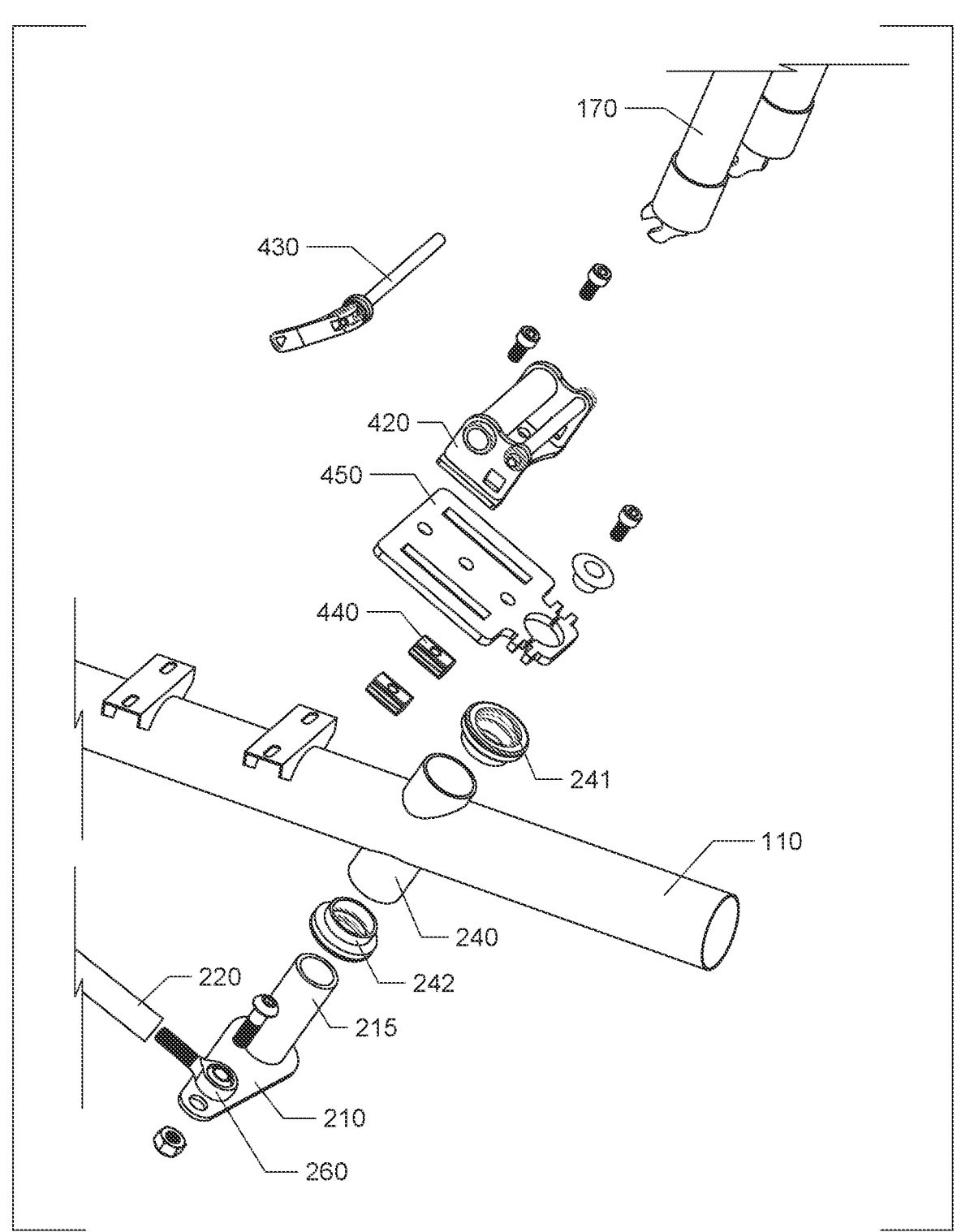
Figure 4F:
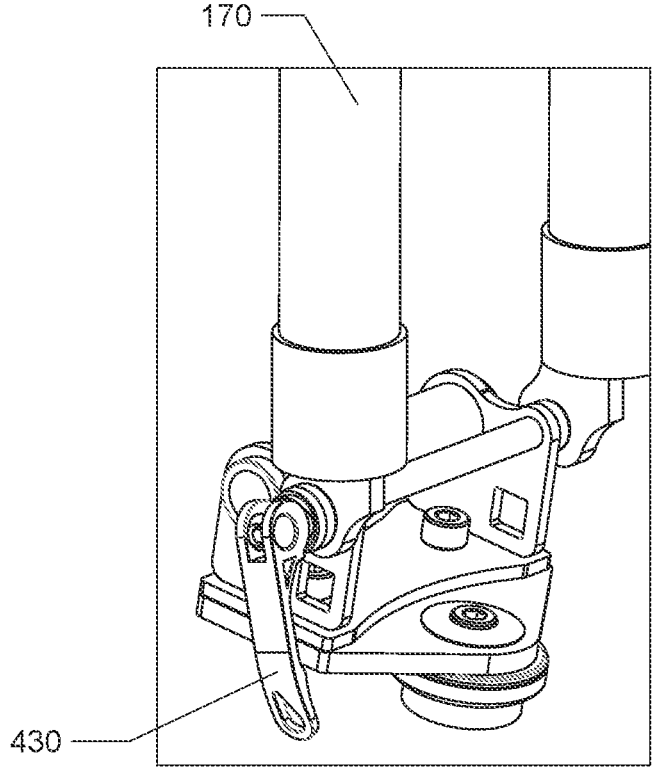

As illustrated in FIGS. 4A-4F, a steering adapter system 125 may be comprised of a fork coupling assembly 410 and a steering assembly 130. The steering adapter system 125 allows a steering converter 210 to be functionally coupled to the fork 170 of the subject bicycle 140 through a fork coupling assembly 410. The fork coupling assembly 410 comprising a fork mount component 420 and a fork rake adjuster plate 450 (see, FIG. 4A) is rotatably coupled to the steering assembly 130. In some embodiments, the fork coupling assembly 410 further comprises an axle 430 by which the fork of the subject bicycle 140 attaches to the fork coupling assembly 410 (see, FIG. 4F). As discussed herein, the fork coupling assembly 410 facilitates the functional coupling of the steering converter 210 to the fork 170 attached to the subject bicycle 140. As the rider actuates the handlebars 160 of the subject bicycle 140, the fork coupling assembly 410 ensures that the movement of the handlebars 160 is converted in a 1:1 ratio to corresponding movement in the steering assembly 130, e.g., via a steering converter 210, and ultimately translated to the fork 230 attached to the cargo conversion frame 110, thus facilitating ease of steering the cargo bicycle. As would be readily recognized by one of ordinary skill in the art based on the present disclosure, the fork 170 of the subject bicycle 140 can be attached to the fork coupling assembly 410 through various mechanisms, including but not limited to, a quick-release mechanism, i.e., axle 430, as illustrated in FIG. 4F, or a nut and bolt mechanism (not shown), or other mechanisms known in the art. Other mechanisms may include, but are not limited to, quick release skewers, thru axle skewers, straps, a solid axle with nuts, fork pinching mechanisms, and combinations and variations thereof. In some embodiments, the components of the fork coupling assembly 410, i.e., fork mount component 420 and fork rake adjuster plate 450, can be attached to each other by welding, pinch bolts, bolt and nut combinations, and/or machined from a solid piece of material.

For purposes of clarity, FIG. 4B illustrates an exploded view of individual components of the an embodiment of the steering adapter system 125, i.e., fork mount assembly 410 and steering assembly 130, of present invention and how they may relate to one another, but is not intended to be comprehensive or limiting. FIG. 1B is intended to be non-limiting and exemplary only.

In some embodiments, a fork mount assembly 410 may be comprised of a fork mount component 420, see FIG. 4C, and fork rake adjuster plate 450, see FIGS. 4D and 4E, wherein the fork mount component 420 is adjustably coupled to the adjuster plate 450 via, e.g., T-nuts 440. The upper end of the assembly, i.e., the fork mount component 420 receives the fork 170 of the subject bicycle 140, wherein the fork 170 is secured thereto via, e.g., a thru bolt 430 (as shown in 4F) that may or may not be of a quick release style.

Fork mounts for use with various bicycles are known in the art. As depicted in FIG. 4C, a fork mount component 420 of the present invention may be comprised of a base plate 424 corresponding generally but not necessarily in relative size to a fork rake adjuster plate 450, at least one or preferably a plurality of fork mount supports 423 extending generally vertical there from, and at least one, or preferably a plurality of fork mounts 421, 422, e.g., 9 mm and 15 mm, mounted on and/or piercing the at least one fork mount support 423, wherein the fork mount or mounts further comprise an aperture extending there through 421a, 422a for receiving a thru bolt 430 or the like. In a standalone fork mount component 420, the base plate 424 may further comprise at least one coupling aperture 425 through which fastening means may be insert for coupling purposes, e.g., coupling to a fork rake adjuster plate. In some embodiments, a fork mount assembly 410 may comprise a single, unitary component comprising a fork mount component 420 and a fork rake adjuster plate component 450 integrally combined via fabrication, welding, or the like. In some embodiments, the fork mount component 420, may comprise a plurality of individual mounts accommodating different size subject bicycle forks 170, e.g., 9 mm and 15 mm, the fork mount component 420 adjustably and slidably coupling with the fork rake adjuster plate 450 with one or more fastening means for providing fore and aft adjustability.

Two embodiments of fork rake adjuster plates 450, depicted in FIGS. 4D-E, comprise a plate 450 comprising at least one, or preferably a plurality of, elongated apertures 455 there through, and at least one pinch clamp aperture 456 corresponding generally in size and shape to a standard bicycle head tube facilitating coupling thereto. Multiple additional variations and embodiments falling within the scope of this disclosure are possible and may be recognized by the skilled artisan. Each embodiment enables that a fork mount component 420 may be slidably coupled to a fork rake adjuster plate 450 by, e.g., inserting t-nuts 440 (FIG. 4B) up through the elongated aperture 455 of the plate 450, aligning the fork mount component coupling aperture(s) 425, and securing the t-nuts 440 with the corresponding fastening means, e.g., bolt. The fork mount component 420 may be slidably adjusted in relation to the fork mount adjuster plate 450, i.e., fore and aft, to adjust the rake of the subject bicycle fork 170 by loosening the coupling means, i.e., t-nuts 440, slidably adjusting the fork mount component 420, and re-tightening the coupling means to secure the adjustment into place. The fork rake adjuster plate 450 of the present disclosure facilitates the installation and effective integration into the present cargo bicycle conversion system the use of bicycle forks having different rake in comparison to the cargo conversion system fork 230 of the present invention. The fore and aft adjustability of the fork mount component 420 in relationship to the fork rake adjuster plate 450 allows for a variety of styles of bicycle forks to be utilized with the present invention without sacrificing or losing steering capability and/or control.

The fork rake adjuster plate 450 is rotatably coupled to a steering arm 250 having a distal end steering converter flange 210 extending there from, wherein the steering arm 215 passes through a channel or aperture, i.e., a head tube, 240 mounted through, e.g., piercing, the conversion frame 110, such that the steering converter flange 210 is appropriately positioned and may engage with and rotatably couple to the proximal end of the steering linkage 220.

Returning now to FIG. 4A, it is shown that the steering arm 215 (not shown) having a steering converter flange 210 is seeded through a head tube 240 having and upper bearing headset 241 and a lower bearing headset 242, to which a fork coupling assembly 410 comprised of a fork rake adjuster plate 450 and fork mount component 420 is rotatably coupled via, e.g., the fork rake adjuster plate pinch clamp 460 and/or the upper headset 241. A subject bicycle fork 170 may be removeably coupled to the fork coupling assembly 410 as shown in FIG. 4F. As depicted in FIGS. 2A-C, the steering adapter system 125, comprised of a steering assembly 130 and fork coupling assembly 410, translates the movement of the subject bicycle fork 170, through the steering converter flange 210, to the conversion fork 230.

Additionally or alternatively, the steering adapter system 125 can include the functional extension of the steering mechanism, e.g., handlebars 160, of the subject bicycle 140 to the fork 230 or wheel 250 attached to the cargo conversion frame 110. For example, one or more coupling components can be used to connect a portion of the subject bicycle's steering mechanism to, for example, the fork 230 attached to the cargo conversion frame 110. This configuration embodiment allows the rider to steer the cargo bicycle via direct steering and without the inclusion of fork coupling components or a steering converter. In such embodiments, a steering linkage can be configured, e.g., to extend lengthwise along a top portion of the cargo container as the steering adapter system 125 extends directly from the subject bicycle 140 to the fork 230 attached to the cargo conversion frame 110. As the rider actuates the handlebars 160 of the subject bicycle 140, the coupling component(s) ensures that the movement of the handlebars 160 is converted to corresponding movement in the fork 230 attached to the cargo conversion frame 110, and thus, steering the cargo bicycle.

Figures 5A, 5B, 5C:
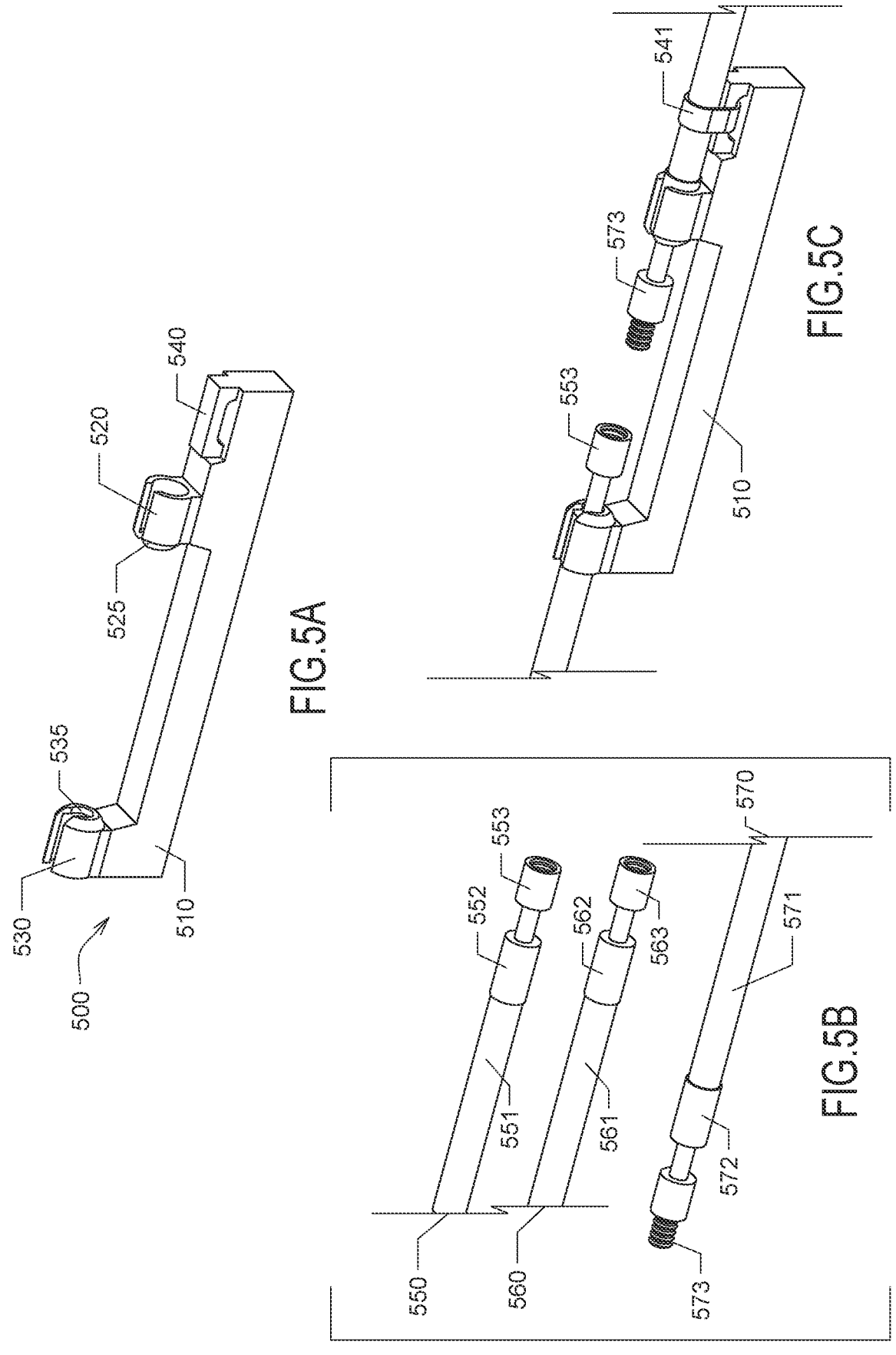
FIGS. 5A-5C are representative images of components of a brake cable split housing system, according to one embodiment of the present disclosure.

Turning now to FIGS. 5A-C, a brake cable split holder and brake cables are depicted. As shown in FIG. 5A, a brake cable split holder 500 comprising a base element 510, a first housing stop 520, a second housing stop 530, and a cable fastening bridge 540. The brake cable split holder may be constructed or manufactured from any number of materials, e.g., grass (bamboo), wood, paper, plastic, metal, metal alloys, polymeric material, carbon fiber, and combinations and variations thereof. FIG. 5A shows one embodiment of a brake cable split holder 500 having an elongated base body 510 with a first cable housing stop 520 disposed on one end of the base 510, and a second cable housing stop 530 disposed on about the opposite end of the base body 510. Extending beyond the first cable housing stop 520 is a tab having disposed thereon a cable fastening bridge 540, where under a fastening means, e.g., cable tie, may be inserted for securing a cable, e.g., subject bicycle brake lever cable, to the brake cable holder 500. Each of the cable housing stops, 520, 530, comprise a tube-like configuration having a graduated slot-aperture there through 525, 535, wherein the outer-facing slot aperture diameter is larger than and narrows to a smaller inner-facing slot aperture diameter, and wherein a slot aperture runs from the outer to the inner ends of the cable housing stops and is capable of receiving a cable of standard size inserted there through.

Standard brake cables used for bicycle brakes are comprised of an inner wire, or cable, an outer housing, and a housing end cap. As is known in the art, in general, when the brake caliper of a bicycle is engaged it pulls the cable through the housing and the housing pushes back with an equal amount of force. The cable housing's ability to maintain force, e.g., compression, therefore corresponds directly to the amount of force a cable may translate through the housing. Thus, in order to stop a bicycle, a rider squeezes a brake lever on the handle bar of the bicycle to which a cable originating from, e.g., calipers on the front wheel, is functionally coupled, thereby engaging the calipers, and in turn engaging brake pads that press against the wheel.

The brake system of the cargo bicycle conversion system of the present invention, through the brake cable split holder translates the subject bicycle brake cable lever engagement (pull) from the brake lever of the subject bicycle, through a brake cable to a front wheel brake either of the subject bicycle brake caliper or the cargo frame brake caliper. In order for the power of the brake cable to be accordingly transferred (through the connecting parts), the brake cable split holder 500 is functionally inserted into the brake system of the cargo bicycle conversion system and connected such that engagement of the brake lever of the subject bicycle pulls the coupled cables within the coupled housings. The brake cable splitter functionally couples the subject bicycle brake cable and the selected brake caliper cable. The brake cable split holder functionally couples the subject brake cable housing and the select brake caliper housing.

As depicted in FIG. 5B, in one embodiment of the braking system of the present invention is comprised of: a cargo conversion brake caliper cable 550 having a cable housing 551, the distal end of the cable functionally coupled to the brake caliper of the cargo conversion system, the proximal end further comprising a housing end cap 552 and a female cable splitter 553 mourned to the proximal terminus; a subject bicycle brake caliper cable 560 having a cable housing 561, the distal end of the cable functionally coupled to the brake caliper of the subject bicycle, the proximal end further comprising a housing end cap 562, and a female cable splitter 563 mourned to the proximal terminus; and a subject bicycle brake lever cable 570 having a cable housing 571, the distal end of the cable functionally coupled to the brake lever of the subject bicycle, the proximal end further comprising a housing end cap 572, and male cable splitter 573 mounted to the proximal terminus.

As shown in FIG. 5C, the cable housing stops 520, 530 act as a receiving socket for the cable(s) 550, 560, 570 and corresponding cable housing 551, 561, 571, each cable housing stop having corresponding apertures 525, 535 through which each cable may pass. In one example, the proximal end of the cable and housing of the subject bicycle brake lever cable 570 is received by the first end of the brake cable split holder, wherein the cable housing is fitted into and through the first cable stop 520 and cable stop aperture 525. The proximal cable terminus continues through the aperture 525 of the cable stop 520 to about the center of the brake cable stop housing body before a first cable splitter, e.g., male cable splitter, is mounted thereon, e.g., mechanically attached.

The brake cables of the cargo conversion frame brake caliper 550 and the subject bicycle brake caliper 560 each have a corresponding and opposite cable splitter, e.g., female cable splitter, mounted to their respective proximal termini, e.g., mechanically attached. Each of the respective brake cables of the cargo conversion frame 550 and the subject bicycle 560 have brake cable housings that are long enough such that the proximal end of the cable is able to reach to and engage with the brake cable split holder. Thus, a brake cable and housing selected and engaged either from the cargo conversion frame 550 or the subject bicycle 560 will determine which brake will be pulled by the force produced by engagement of the subject bicycle brake lever. For example, when the cargo bicycle conversion system of the present invention is engaged with a subject bicycle, the brake cable and housing corresponding to the cargo conversion frame will functionally couple to the brake cable split holder such that actuation of the subject bicycle brake lever actuates the brake of the wheel mounted on the cargo conversion frame. Functional engagement of the selected brake cable terminus comprises, e.g., inserting the brake housing and cable from the selected caliper into the second and opposite housing stop 530 of the brake cable split housing. The caliper housing inserts into the cable stop and the cable splitter from the brake caliper cable may be functionally engaged with the subject bicycle brake lever cable by threading the female cable splitter into the male cable splitter mounted on the subject bicycle brake lever cable. Thus, the force produced by the pull of the overall cable, e.g., the subject bicycle brake cable combined with the connected brake caliper cable, is shared by the housing of the subject bicycle lever cable, the body of the brake cable split housing and the housing of the caliper cable, allowing the force exerted on the cable by the subject bicycle brake lever to be translated to the select brake caliper.

In some embodiments, the subject bicycle brake lever cable 570 is secured to the brake cable split holder 500 via an attachment means 541, e.g., cable tie or the like. (See, FIG. 5C) The cable 670 may be secured by inserting the attachment means through the aperture created between the cable fastening bridge 540 and the brake cable split holder base 510, engaging the attachment means about the cable 570, and thereby preventing the brake cable split housing from moving and/or falling off the subject bicycle, e.g., when shifting between the cargo conversion brake caliper and the subject bicycle caliper.

A Preferred Embodiment of a Cargo Bicycle Conversion System

Installation of the instant conversion system begins with obtaining a Cargo Bicycle Conversion System Kit ("Kit"), comprised of: a cargo conversion frame comprising a rear, a middle, and a front section; a frame coupling component comprising a bottom bracket adapter comprising at least one threaded bottom bracket plate; at least one unthreaded bottom bracket plate, a bottom bracket tube comprising a female tube section and a male threaded tube section, a through bolt, and optionally, a lock ring; a steering adapter system 125 comprising a fork mount, a fork rake adjuster plate, steering linkage, steering arm; a cargo container; and plurality of fastening, coupling, and attachment means corresponding to each of the components of the Kit. Alternatively, each of the components of a kit may be individually obtained and installed on a subject bicycle. Next, the appropriate subject bicycle is selected for use with the cargo bicycle conversion system of the present invention. The subject bicycle may be a standard bicycle having a non-suspended frame, or lockable suspension frame. The subject bicycle may be a standard bicycle having a standard non-suspended fork or lockable suspension fork. The bottom bracket ("BB") of the subject bicycle may range in size from 67 mm to 88 mm, preferably, 68 or 73 mm, and be an English Threaded Bottom Bracket. The subject bicycle may further comprise a cable actuated front brake, an about 9 mm or about 15 mm axle front fork, a front wheel that is about 24-29 inches if the subject bicycle is a mountain bicycle style, or about 650c or about 700c if subject bicycle is a road bicycle style. Hydraulic braking mechanisms may be utilized in combination with the present invention, but may further necessitate a different clamp on brake lever. The Cargo Bicycle Conversion System of the present invention attaches at three points on a subject bicycle: Bicycle Frame, Bicycle Fork, and the Bicycle Brake System.

Installation of the Cargo Bicycle Conversion System

To begin installation of the Conversion System, a conversion frame comprised of a, for example, front frame section, a middle frame section, and rear frame section is assembled by coupling the front frame to the middle frame, and coupling the middle frame to the rear frame. The front frame can be comprised of, e.g., an about 2 inch chromoly tube bent at about a 150 mm radius and about 1⅛ inch (about 48 mm) standard head tube mounted, e.g., welded, through and piercing the distal end for receiving a conversion fork, and a about a 48 mm diameter 250 mm tube collinearly mounted (100 mm internal with 150 mm expose), e.g., welded, to the proximal end of the front frame, the collinear extension and/or the front frame having at least one, and preferably a plurality, of corresponding apertures there through (see, e.g., FIG. 1B, indicia 105, 106) for receiving coupling means. The front frame may further comprise at least one, preferably a plurality, of flat mounts permanently or semi-permanently affixed to its top surface fir receiving and attaching a cargo container.

The middle frame, comprised of, e.g., an about 2 inch chromoly tube having a front and a rear end, wherein the front end of the middle frame having at least one, or preferably a plurality, of apertures there through for receiving coupling means, receives the proximal end of the front frame having a collinear tube which is inserted into the middle frame until the one or a plurality of coupling apertures aligns with the coupling apertures of the front frame, through which fastening means are inserted to secure the front frame to the middle frame. Alternatively, in some embodiments a front frame may be comprised of, e.g., a chromoly tube having a corresponding slightly larger diameter, at least on its proximal end, than the front end of the middle frame, may be employed. The relative configuration and size of the front frame and middle frame is such that the front frame and middle frame may be integrally combined by sliding the former into the latter, or the latter into the former, aligning the at least one aperture, and securing the positional placement of the front and middle frames via insertion of fastening means, e.g., bolts or the like, through the aligned apertures and securing the fastening means. The Middle Frame is further comprised of a centrally disposed standard head tube (as described above) in such a position as to receive a steering arm. The middle frame may further comprise one or a plurality, of flat mounts permanently or semi-permanently affixed to its top surface for receiving and attaching a cargo container. The middle frame (and/or the rear frame) may also further comprise a section configured to receive and mount a kickstand or the like. The rear end of the middle frame comprises a means, e.g., at least one key slot pinch clamp, for receiving and securing proximal end of the rear frame. For example, a key slot positioned approximately at the 3-o'clock position and a key slot positioned approximately at the 9-o'clock position on the rear end of the middle frame provide flexibility for the middle frame to receive the rear frame and be secured, e.g., clamped, to prevent slipping between the two frame (see, FIG. 1B, indicia 107, 108). Key slot clamping mechanisms may also be employed for connecting a front frame and/or middle frame. Aperture alignment and/or key slot clamp fastening means each provide lateral adjustability of the cargo conversion frame.

The rear frame, having a distal and proximal end, is comprised of, e.g., about 48 mm tube having a bottom bracket link clamp (BB link clamp), e.g. pinch clamp, permanently attached, e.g., welded, to the distal terminus thereof (see, FIG. 1B, indicia 375). The proximal end of the rear frame is inserted into the rear end of the middle frame, e.g., approximately half-way into the length of the middle frame, with the BB Link Clamp vertically oriented such that it is situated on the top of the rear frame allowing the bolts of the BB Link Clamp to be tightened. By adjusting the position of the rear frame within the middle frame, the rear frame may be employed to adjust the overall length of the assembled cargo conversion frame. Alternatively, similar adjustments of length to accommodate cargo containers may be accomplished by similar adjustment movement between the front frame and middle frame to align and secure different attachment means apertures.

After conversion frame is assembled, the cargo container can be rested on the flat mounts aligning apertures in the cargo container based with the flat mounts. Fasteners (e.g. bolts) are inserted into and through each of the cargo container base apertures and corresponding nuts attached at the underside of each flat mount.

Bicycle Frame Attachment

A frame coupling adapter comprising a bottom bracket link assembly, or BB link assembly, is installed on the frame of the subject bicycle to create an attachment point for the rear frame of the cargo bicycle conversion system. The BB link assembly, comprising at least one BB plate, at least one BB tube, at least one thru bolt, and an optional lock ring, facilitates the precise fitting and adjustment for the use of the conversion system with subject bicycles having bottom bracket shells ranging from about 67 mm to 88 mm in width. First, the cranks of the subject bicycle are pulled and the bottom bracket removed. A threaded bottom bracket plate and a non-threaded bottom bracket plate (BB Plates) are installed on each side of the subject bicycle frame between the bottom bracket shell of the frame and the bottom bracket using the bottom bracket as the fastening means (see, FIG. 3C). To install, the threaded BB plate is set in place with the BB tube stop facing the, e.g., drive side, of the BB shell with the center of the upper aperture (e.g., BB shell aperture sized aperture) aligned with the center of the BB shell. The corresponding bottom bracket is inserted through the threaded BB plate into the BB shell and threaded from about 50-99%, preferably about 90%, to partially tighten. For simplicity of use, the threaded BB plate is preferably installed on the drive side of the subject bicycle, but either BB plate may be installed on the drive and/or non-drive sides of the subject bicycle. Next, the non-threaded BB plate is set in place with the BB tube stop facing the, e.g., non-drive side, of the BB shell with the center of the upper aperture aligned with the center of the BB shell, i.e., mirroring the drive side of the BB shell/threaded BB plate assembly. The corresponding bottom bracket cup is inserted through the non-threaded BB plate into the BB shell and tightened onto the drive side bottom bracket, such that the bottom bracket acts as the fastener of the assembly, wherein the lower about half of the bottom bracket plates are now positioned below the bottom bracket shell of the subject bicycle.

Next, a bottom bracket adjuster tube (BB tube) comprised of one threaded male portion and one threaded female portion is adjusted to its smallest length by tightening the threads. Preferably, each portion of the BB tube may be approximately the same size in length of the opposite and corresponding portion, but alternative embodiments may comprise functional BB tubes of disproportionate portion sizes. The BB tube is inserted between the lower apertures of the assembled BB plates and held in place via, e.g., a thru bolt inserted through the non-threaded BB plate, into the and through the BB tube and partially threaded into the opposite BB plate. The drive side bottom bracket is torqued to specification while the BB plate is maintained in the dead center of the bicycle. Optionally, a lock ring may be employed if the bottom bracket of the subject bicycle has no flange. Next, the non-drive bottom bracket is torqued to specification. The BB tube is now lengthened by un-threading, i.e., unscrewing, until it matches in length to the space created between the installed BB plates and cannot be lengthened further. With one hand, the installer holds the BB tube adjustment in place, and with the other hand removes the thru bolt therefrom. The BB tube is then removed from the BB plate assembly and mounted into the distal end BB link clamp of the rear frame, centered, and the clamp tightened down to securing the BB tube in place. Finally, the cranks are reinstalled on the subject bicycle.

As installed, the BB plates reside on the bicycle and the BB Tube resides on the rear conversion frame Those skilled in the art will understand that BB plates and/or a BB tube's respective residing positions may be reversed, and that either the plates and/or the tube may be manufactured as part of a subject bicycle frame.

Steering Conversion System and Fork Attachment

Moving to the subject bicycle fork point of attachment to the cargo bicycle conversion system, a fork mount assembly comprising a fork mount and a fork rake adjuster plate forms the proximal end of the steering adapter system and is employed to allow for subject bicycle forks with different rake to be utilized with the present Cargo Bicycle Conversion System. Fork rake, also known as offset, in this case is the offset of the subject bicycle fork from the steering axis. In order to accommodate multiple subject bicycle configurations and styles, the fork rake adjuster plate has fore and aft adjustment capability, for example, via a 9 mm/15 mm fork mount slidably attached to the fork rake adjuster plate. A typical fork mount has attachments for 9 or 10 mm standard hub forks or may utilize a 15 mm thru axle to secure the fork. In this embodiment of the present invention, a fork mount comprising both a 9 mm and 15 mm fork mount, wherein, the 9 mm mount works with forks using a quick release 9 mm hub or a 10 mm bolt on hub, and the 15 mm side of the fork mount works, for example, for forks that use a 15 mm thru axle hub. In the present invention, preferably, a combination 9 mm/15 mm fork mount is coupled to a fork rake adjuster plate via, e.g., 2 t-slot nuts and bolts, which is mounted to the proximal end of a steering arm. The distal end of the steering arm comprises a steering converter flange that rotatably couples to the proximal end of the steering linkage. The distal end of the steering linkage rotatably couples, e.g., via heim bolt, to a steering tab of the conversion frame fork.

To install the steering system, the front wheel of the subject bicycle is removed. The front end of the subject bicycle is lifted and the fork is mounted and secured to the fork mount component of the steering system. Next, if a split steering linkage is supplied, the first front portion of the steering linkage is coupled to the second rear portion of the linkage via a standard hex bolt. A heim joint is threaded about one-half inch into the end of the front (distal end) of the steering linkage and the process repeated at the rear (proximal end) of the steering linkage with either a heim joint or shoulder bolt. To attach the proximal end of the steering linkage to the steering converter flange, the shoulder bolt is inserted through a bushing, then through the flange, and fastened with a nut. The steering converter flange is not positioned at a 90 degree position in relation to the cargo conversion frame, the cargo conversion fork and wheel are placed in a straight ahead (collinear) position to the subject bicycle, and the heim joint attached to the distal end of the steering linkage is lined up with the aperture in the fork tab. A shoulder bolt is dropped through the heim joint and tab, and then tightened with a nut. Finally, the fork rake adjuster plate is placed into collinear position with the frame of the subject bicycle with the steering arm flange still positioned at 90 degrees, and the upper and lower headsets installed.

To assemble the Steering Linkage, the proximal and distal ends of the steering linkage are couple to steering arm and steering tab, respectively. The distal end of the Steering Linkage is rotatably coupled to the conversion frame fork by inserting, e.g., an M10 Shoulder Bolt through an aperture in the heim joint and the steering tab, and torqued to specification using nut. The proximal end of the Steering Linkage is attached to the [flange], e.g., by inserting an m8 Shoulder Bolt through an aperture of appropriate size, about 8 mm, in the Steering Linkage, then an 8 mm Bushing, and then through the Steering converter flange. To secure the coupling, e.g., a Nylon Stainless Nut is installed with an e-clip there under.

Proper adjustment of the rear frame in relation to the fork mount facilitates easier engagement between the subject bicycle and container section and more predictable steering. To adjust, the two bolts that attach the Fork Mount to the Adjuster Plate are loosened, subject bicycle handlebars turned to identify the center, i.e., mid-range of fore and aft sliding, of the Fork Mount's movement, at which point the bolts are tightened to lock the Rear sub-Frame in place. assembled, the cargo container can be rested on the flat mounts aligning the holes in the cargo container with the holes in the flat mounts. Fasteners (e.g. bolts) will be inserted into each of the holes of the cargo container and a corresponding nut will be attached at the underside of the flat mount.

Brake Adapter System and Brake Split Holder Attachment

Finally, the braking system is installed. The conversion brake cable and housing run from the disc caliper up, e.g., the fork leg, along the steering linkage, optionally through an aperture in the fork rake adjustment plate, and is secured to the brake split holder. The cable(s) may be removeably secured to the bicycle via cable ties, or the like.

In order to be able to quickly adapt the brake system of either the subject bicycle front wheel or the conversion frame wheel, a brake split adapter holder is employed. A brake split holder allows for the brake cable from the brake lever of the subject bicycle to be connected to and engage either the brake of the conversion frame or the brake of the subject bicycle. Brake split adapters are known in the art and may be employed, e.g., to couple brake cables on a bicycle with tube couplers. However, a brake split holder of the present invention and disclosed herein is removeably mounted to the brake housing of the subject bicycle and positioned such that the cable housing of the subject bicycle runs to a first housing stop on one side of the cable splitter. The brake split holder is fastened to the housing from the subject bicycle immediately prior to it entering the housing stop. Both the conversion frame brake cable and the subject bicycle brake housing can be easily removeably run to the second side of the cable splitter its respective brake caliper. Thus, the brake cable split holder effectively couples the housing from the subject bicycle to either the cargo system brake caliper or the subject bicycle brake caliper.

To install the brake cable split holder, the distal end of the subject bicycle brake lever cable having a male cable splitter mounted thereon is inserted into the first end of the brake cable split holder and secured with a cable tie. Ensure that each of the brake cables connected to either subject bicycle fork or the conversion frame fork have a female cable splitter mounted thereon. To engage the conversion frame fork brake caliper cable, the cable is inserted into the slot aperture of the brake cable split holder and threaded onto the male cable splitter of the subject bicycle lever cable. To switch brakes for disengagement of the cargo bicycle conversion system and engagement of the subject bicycle brake, the conversion frame brake cable is unscrewed from the bicycle brake lever cable, and the subject bicycle brake caliper cable is substituted therefor and screwed onto the subject bicycle brake lever cable.

Engagement/Disengagement of the Conversion System

In use, the cargo bicycle conversion system of the present invention may be engaged by the following steps: removing the front wheel of the subject bicycle having the system of the present invention installed; placing the subject bicycle fork onto the fork mount of the cargo frame steering assembly; situating the BB plates of the subject bicycle about the BB tube that has been coupled to the rear cargo frame; securing the fork to the fork mount via a standard quick release skewer or thru axle inserted there through; inserting a thru bolt through the unthreaded BB plate, through the BB tube, and threading and tightening it into the threaded BB plate; detaching the subject bicycle brake cable; and attaching the cargo frame brake cable. Disengagement of the system may be achieved by reversing the above-described steps.

Embodiments of the present disclosure also include a cargo bicycle conversion kit that includes the various components described above, including but not limited to, a cargo conversion frame detachably connected to a subject bicycle, at least one frame coupling component detachably connecting the cargo conversion frame to a portion of the frame of the subject bicycle, and a steering adapter system functionally coupling a fork on the subject bicycle to a fork on the cargo conversion frame. The cargo bicycle conversion kit generally facilitates the reversible conversion of a subject bicycle into a cargo bicycle.

A number of variations and modifications of the disclosure can be used. It would be possible to provide for some features of the disclosure without providing others. The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, for example, for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, for example, as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A cargo bicycle conversion kit comprising:
a cargo conversion frame detachably connecting to a subject bicycle;
at least one frame coupling component detachably connecting the cargo conversion frame directly to a bottom bracket of the subject bicycle; and a steering adapter system functionally coupling a subject bicycle fork to a cargo conversion frame fork or ef extending a steering mechanism from a handlebar of the subject bicycle to the conversion frame, the steering adapter system translating turning radius differential;
wherein the cargo bicycle conversion kit facilitates the reversible conversion of the subject bicycle into a cargo bicycle.

2. The cargo bicycle conversion kit of claim 1, further comprising a reversibly detachable brake adapter system comprised of a brake split housing adapter functionally coupling a brake lever cable of the subject bicycle to a brake caliper cable attached to the cargo conversion frame, wherein the brake adapter system reversibly detaches without reconfiguration of brake lever cable or brake caliper cable.

3. The cargo bicycle conversion kit of claim 1, wherein the at least one frame coupling component comprises a bottom bracket adapter coupling the cargo conversion frame directly to the bottom bracket of the subject bicycle and detachably connecting the cargo conversion frame to the frame of the subject bicycle; and
the steering adapter system comprises a functionally coupled steering assembly and adjustable and locking fork coupling assembly functionally coupling the subject bicycle fork to the cargo conversion frame fork.

4. The cargo bicycle conversion kit of claim 3, wherein the fork coupling assembly comprises at least one of the following connecting mechanisms for detachably connecting the fork attached to the subject bicycle to a steering converter: quick release skewers, thru axle skewers, straps, a solid axle with nuts, fork pinching mechanisms, and combinations and variations thereof.

5. The cargo bicycle conversion kit of claim 1, wherein the steering adaptor system is comprised of a steering linkage having a proximal end and a distal end, the steering linkage distal end functionally coupling to the cargo conversion frame fork, and wherein movement of the fork attached to the subject bicycle fork causes corresponding movement of the cargo conversion frame fork through actuation of a steering converter and the steering linkage.

6. The cargo bicycle conversion kit of claim 5, wherein the steering linkage extends from a steering converter flange to the cargo conversion frame fork along a path that is substantially adjacent to the cargo conversion frame.

7. The cargo bicycle conversion kit of claim 1, wherein the cargo bicycle conversion kit further comprises a front wheel functionally couplinge to the fork of the cargo conversion frame.

8. The cargo bicycle conversion kit of claim 1, wherein the cargo bicycle conversion kit further comprises at least one cargo container, the at least one cargo container detachably couplinge to the cargo conversion frame.

9. The cargo bicycle conversion kit of claim 1, wherein the at least one frame coupling component detachably connects the cargo conversion frame to a portion of the frame of the subject bicycle by mechanism comprising at least one securable thru bolt.

10. The cargo bicycle conversion kit of claim 1, wherein the cargo conversion frame comprises a substantially linear portion extending a certain distance from an area below the bottom bracket of the subject bicycle to the cargo conversion frame fork to accommodate a cargo container.

11. The cargo bicycle conversion kit of claim 1, wherein the cargo conversion frame is comprised of a distal end and a proximal end, the distal end angling upwards to accommodate the cargo conversion frame fork.

12. The cargo bicycle conversion kit of claim 1, wherein the frame coupling component is a bottom bracket adapter.

13. The cargo bicycle conversion kit of claim 12, wherein the bottom bracket adapter comprises at least one bottom plate or flange that may be mounted on the side of the bottom bracket shell of the subject bicycle.

14. The cargo bicycle conversion kit of claim 13, wherein the at least one bottom plate or flange mounts between a pedal crank arm of the bicycle and the bottom bracket.

15. The cargo bicycle conversion kit of claim 14, wherein the at least one bottom plate or flange has an upper aperture.

\* \* \* \* \*